(12) United States Patent
Fukasawa

(10) Patent No.: US 7,789,303 B2
(45) Date of Patent: Sep. 7, 2010

(54) INFORMATION PROCESSING APPARATUS, DEVICE, INFORMATION PROCESSING SYSTEM, INFORMATION PROCESSING PROGRAM, AND STORAGE MEDIUM STORING THE INFORMATION PROCESSING PROGRAM

(75) Inventor: Nobuaki Fukasawa, Nakano-ku (JP)

(73) Assignee: Canon Kabushiki Kaisha (JP)

( * ) Notice: Subject to any disclaimer, the term of this patent is extended or adjusted under 35 U.S.C. 154(b) by 1048 days.

(21) Appl. No.: 11/467,204

(22) Filed: Aug. 25, 2006

(65) Prior Publication Data

US 2007/0095902 A1 May 3, 2007

(30) Foreign Application Priority Data

Aug. 29, 2005 (JP) .............................. 2005-248162

(51) Int. Cl.
*G06K 5/00* (2006.01)
(52) U.S. Cl. .......................................... 235/382; 726/27
(58) Field of Classification Search ................. 235/382; 726/2, 9, 27; 380/277
See application file for complete search history.

(56) References Cited

U.S. PATENT DOCUMENTS

| | | | | |
|---|---|---|---|---|
| 5,003,594 A | * | 3/1991 | Shinagawa | 713/159 |
| 5,857,024 A | * | 1/1999 | Nishino et al. | 713/172 |
| 6,273,335 B1 | * | 8/2001 | Sloan | 235/382 |
| 7,216,802 B1 | * | 5/2007 | De La Huerga | 235/380 |
| 7,246,228 B2 | * | 7/2007 | Sato et al. | 713/100 |
| 2002/0026424 A1 | * | 2/2002 | Akashi | 705/57 |
| 2003/0071927 A1 | * | 4/2003 | Park et al. | 348/734 |
| 2006/0059549 A1 | * | 3/2006 | Suzuki et al. | 726/9 |
| 2008/0148353 A1 | * | 6/2008 | Dohi | 726/2 |

FOREIGN PATENT DOCUMENTS

JP 2002-073424 A 3/2002

\* cited by examiner

*Primary Examiner*—Michael G Lee
*Assistant Examiner*—Suezu Ellis
(74) *Attorney, Agent, or Firm*—Rossi, Kimms & McDowell LLP

(57) ABSTRACT

An information processing apparatus permits a device which has set secret information into the information processing apparatus to refer to the secret information and inhibits other devices than the device from referring to the secret information, to thereby prevent secret information from leaking via any of the other devices. A determination is made whether there is a match between a device ID acquired from a device connected to an expansion card and stored in the expansion card and a device ID acquired in response to a request for reference to the secret information from a device to which the expansion card is currently connected. Reference to be made by the device to the secret information stored in the expansion card is permitted or inhibited according to a result of the determination.

17 Claims, 20 Drawing Sheets

INFORMATION PROCESSING APPARATUS, DEVICE, INFORMATION PROCESSING SYSTEM, INFORMATION PROCESSING PROGRAM, AND STORAGE MEDIUM STORING THE INFORMATION PROCESSING PROGRAM

BACKGROUND OF THE INVENTION

1. Field of the Invention

The present invention relates to an information processing apparatus that is connected to a device and thereby realizes a predetermined function, a device to which the information processing apparatus is connected, an information processing system that comprises the information processing apparatus and the device, information processing programs that are executed by the information processing apparatus and the device respectively, and storage media storing the respective information processing programs.

2. Description of the Related Art

Conventionally, an information processing apparatus such as an expansion card has been known, which is removably connected to a device such as a printer, and is used for connecting the device and a network. The information processing apparatus and the device store their own license codes. An application for expansion of the function of the device is stored in the information processing apparatus. When starting the application, the information processing apparatus compares the license codes stored in the device and the information processing apparatus, and starts the application only when these two license codes match. When the information processing apparatus is connected to a different device, the application stored in the information processing apparatus is prevented from being used by the difference device.

Further, there has been known a semiconductor device having an enhanced technical protection to prevent unauthorized use of a semiconductor device provided in an applied equipment, which unauthorized use is performed by replacing a semiconductor circuit board of the semiconductor device (Japanese Laid-Open Patent Publication (Kokai) No. 2002-073424) This semiconductor device is provided with a child board that generates a unique identification code when the semiconductor device is shipped as a product, and a parent semiconductor board having a nonvolatile memory that stores the identification code as a stored code. Then, when the semiconductor device is operated, the child board compares the identification code with the stored code, and if the two codes do not match, part of a predetermined circuit on the child board is inhibited from operating.

As described above, the semiconductor device disclosed in Japanese Laid-Open Patent Publication (Kokai) No. 2002-073424 stores the code in the nonvolatile memory of the semiconductor circuit board when the child board having the predetermined circuit is mounted on the semiconductor circuit board to expand the functional capability of the semiconductor device. That is, this semiconductor device has its firmware changed when an information processing apparatus (child board) is mounted on a device (semiconductor circuit board).

However, there has been proposed a system in which information processing apparatuses for providing various capabilities are mounted on a device without changing firmware of the device. In such a system, the firmware of the device is sometimes incapable of handling information on a function inherent to the information processing apparatus. To enable such a system to look up the information unique to the information processing apparatus, it is preferable that the information is not stored in the device as in Japanese Laid-Open Patent Publication (Kokai) No. 2002-073424, but is stored in the information processing apparatus.

On the other hand, assuming that information such as a secret key (hereinafter referred to as "secret information") is stored in the information processing apparatus, if the information processing apparatus which was connected to a first device and was in use is connected to a second device, the secret information is directly passed to the second device, which can cause leakage or unauthorized use of the secret information.

For example, there is an information processing apparatus that provides a wireless LAN capability. Even when it is desired to permit only the first device to access the wireless LAN, if the information processing apparatus holding authentication information necessary for connecting to an access point is detached from the first device and then connected to the second device, the second device can connect to the access point using the authentication information. Further, if the information processing apparatus holds secret information for use in encrypted communication over the wireless LAN, such information is easily viewed and used by the second device.

Further, if an unauthorized use-preventing technique is employed in which the information processing apparatus authenticates whether a combination of the information processing apparatus and an individual device is valid using license codes or the like as in the prior art, there arises a problem that the combination of the device and the information processing apparatus is difficult to change. For example, there can be a case where, even if secret information used for the combination of an information processing apparatus and a proper device will be unusable, the user sometimes desires to use the information processing apparatus in combination with a different device other than the proper device. To meet such needs, it is necessary to make the secret information in the information processing apparatus updatable according to a device which is used in combination with the information processing apparatus.

As mentioned hereinabove, in the semiconductor device disclosed in Japanese Laid-Open Patent Publication (Kokai) No. 2002-073424, the identification information on the child board is stored in the memory of the parent semiconductor circuit board, and hence there remains room for improvement in terms of ease of license management such as giving permission to enable the operation of the predetermined circuit board on the child board.

SUMMARY OF THE INVENTION

It is an object of the present invention to provide an information processing apparatus which permits a device which has set secret information into the information processing apparatus to refer to the secret information set in the information processing apparatus and inhibits other devices than the device from referring to the secret information, thereby making it possible to prevent the secret information from leaking via any of the other devices, and provide a device to which the information processing apparatus is connected, an information processing system comprising the information processing apparatus and the device, information processing programs respectively executed by the information processing apparatus and the device, and storage media storing the respective information processing programs.

To attain the above object, in a first aspect of the present invention, there is provided an information processing apparatus that realizes a predetermined function using secret information stored therein, when the information processing apparatus is in a state connected to a device, comprising a secret information-acquiring section that acquires secret information from a device to which the information processing apparatus is connected, a first identification information-acquiring section that acquires, from the device to which the information processing apparatus is connected, identification information for uniquely identifying the device, a secret information storage section that stores the secret information acquired by the secret information-acquiring section, an identification information storage section that stores the identification information acquired by the first identification information-acquiring section, a second identification information-acquiring section that acquires, from a device to which the information processing apparatus is connected, identification information for uniquely identifying the device, in response to a request for reference to the secret information, a determination section that determines whether or not the identification information stored in the identification information storage section and the identification information acquired by the second identification information-acquiring section match, and a control section that permits or inhibits reference to be made by the device to which the information processing apparatus is connected to the secret information stored in the secret information storage section, according to a result of the determination by the determination section.

With the configuration of the information processing apparatus according to the first aspect of the present invention, a device which has set secret information into the information processing apparatus is permitted to refer to the secret information set in the information processing apparatus and other devices than the device are inhibited from referring to the secret information, and therefore, it is possible to prevent the secret information from leaking via the other devices. Further, the permission or inhibition of reference to the secret information is determined from identification information on the device, whereby the control of reference to the secret information can be facilitated.

Preferably, the device to which the information processing apparatus is connected makes a request for reference to the secret information, the second identification information-acquiring section acquiring the identification information from the device having made the request for reference to the secret information, and the control section permitting or inhibiting reference to be made by the device having made the request for reference to the secret information to the secret information, according to the result of the determination by the determination section.

Also preferably, the secret information-acquiring section acquires the secret information from the device to which the information processing apparatus is connected, in response to a request for setting the secret information, and the first identification information-acquiring section acquires the identification information from the device to which the information processing apparatus is connected.

More preferably, when the request for reference to the secret information has been made, if the secret information has already been stored in the secret information storage section, and the identification information has been stored in the identification information storage section, the secret information storage section stores secret information newly acquired by the secret information-acquiring section, by overwriting, and the identification information storage section stores identification information newly acquired by the first identification information-acquiring section by overwriting.

With the configuration of this preferred embodiment, the information on a device to be permitted to refer to the secret information can be updated even after such a device is once determined, making it possible to freely change the combination of the information processing apparatus and the device.

More preferably, even if the determining section has determined that the identification information stored in the identification information storage section and the identification information acquired by the second identification information-acquiring section do not match, if a request for setting new secret information is made by the device to which the information processing apparatus is connected, the secret information-acquiring section acquires new secret information.

With the configuration of this preferred embodiment, the secret information can be updated by issuing a new request for setting secret information, whereby a device having been inhibited from referring to the secret information before the update can be permitted to refer to new secret information.

More preferably, the information processing apparatus further comprises an associated information storage section that stores associated information in association with the secret information when the secret information storage section stores the secret information acquired by the secret information-acquiring section, and even when the determination section has determined that the identification information stored in the identification information storage section and the identification information acquired by the second identification information-acquiring section do not match, the control section causes associated information to be input via the device, and permits the reference to be made by the device to which the information processing apparatus is connected to the secret information stored in the secret information storage section, if the input associated information and the associated information stored in the associated information storage section match.

With the configuration of this preferred embodiment, by inputting associated information, even a device which has once been inhibited from referring to the secret information can be permitted to refer to the secret information.

To attain the above object, in a second aspect of the present invention, there is provided a device that holds identification information for uniquely identifying the device, comprising a secret information input section that inputs secret information, a secret information-supplying section that supplies the secret information input by the secret information input section to an information processing apparatus connected to the device, a first identification information-supplying section that supplies the identification information to the information processing apparatus connected to the device, a second identification information-supplying section that supplies the identification information to an information processing apparatus currently connected to the device, in response to a request for reference to the secret information, and a result reception section that receives a result of determination by the information processing apparatus connected to the device as to whether or not the identification information supplied by the first identification information-supplying section and the identification information supplied by the second identification information-supplying section match, from the information processing apparatus.

Preferably, the device comprises a display section, and a control section that is operable when the result of determination received by the result reception section shows a match or a mismatch between the identification information supplied by the first identification information-supplying section and the identification information supplied by the second identification information-supplying section, to cause the display section to display permission or inhibition of the reference to the secret information stored in the information processing apparatus currently connected to the device.

With the configuration of this preferred embodiment, it is possible to notify the user of the status of permission or inhibition of reference to the secret information.

More preferably, the device comprises a secret information-setting request-reissuing section that is operable when the result of determination received by the result reception section shows a mismatch between the identification information supplied by the first identification information-supplying section and the identification information supplied by the second identification information-supplying section, to prompt input of new secret information, and when the new secret information is input, to newly issue a request for setting secret information based on the input new secret information.

With the configuration of this preferred embodiment, the secret information can be updated by issuing a new request for setting secret information, whereby a device having been inhibited from referring to the secret information before the update can be permitted to refer to new secret information.

To attain the above object, in a third aspect of the present invention, there is provided an information processing system comprising a device that holds identification information for uniquely identifying the device, and an information processing apparatus that realizes a predetermined function using secret information stored therein, when the information processing apparatus is in a state connected to a device, wherein the device comprises a secret information input section that inputs secret information, a secret information-supplying section that supplies the secret information input by the secret information input section to an information processing apparatus connected to the device, a first identification information-supplying section that supplies the identification information to the information processing apparatus connected to the device, a second identification information-supplying section that supplies the identification information to an information processing apparatus currently connected to the device, in response to a request for reference to the secret information, and a result reception section that receives a result of determination by the information processing apparatus connected to the device as to whether or not the identification information supplied by the first identification information-supplying section and the identification information supplied by the second identification information-supplying section match, from the information processing apparatus, and the information processing apparatus comprises a secret information-acquiring section that acquires secret information from a device to which the information processing apparatus is connected, a first identification information-acquiring section that acquires, from the device to which the information processing apparatus is connected, identification information for uniquely identifying the device, a secret information storage section that stores the secret information acquired by the secret information-acquiring section, an identification information storage section that stores the identification information acquired by the first identification information-acquiring section, a second identification information-acquiring section that acquires, from a device to which the information processing apparatus is connected, identification information for uniquely identifying the device, in response to a request for reference to the secret information, a determination section that determines whether or not the identification information stored in the identification information storage section and the identification information acquired by the second identification information-acquiring section match, and a control section that permits or inhibits reference to be made by the device to which the information processing apparatus is connected to the secret information stored in the secret information storage section, according to a result of the determination by the determination section.

To attain the above object, in a fourth aspect of the present invention, there is provided an information processing program executed by a computer in an information processing apparatus that realizes a predetermined function using secret information stored therein, comprising a secret information-acquiring module for acquiring secret information from a device to which the information processing apparatus is connected, a first identification information-acquiring module for acquiring, from the device to which the information processing apparatus is connected, identification information for uniquely identifying the device, a secret information storage module for causing the secret information acquired by the secret information-acquiring module to be stored in a secret information storage section, an identification information storage module for causing the identification information acquired by the first identification information-acquiring module to be stored in an identification information storage section, a second identification information-acquiring module for acquiring, from a device to which the information processing apparatus is connected, identification information for uniquely identifying the device, in response to a request for reference to the secret information, a determination module for determining whether or not the identification information stored in the identification information storage section and the identification information acquired by the second identification information-acquiring module match, and a control module for permitting or inhibiting reference to be made by the device to which the information processing apparatus is connected to the secret information stored in the secret information storage section, according to a result of the determination by the determination module.

To attain the above object, in a fifth aspect of the present invention, there is provided an information processing program executed by a computer in a device that holds identification information for uniquely identifying the device, comprising a secret information input module for inputting secret information, a secret information-supplying module for supplying the secret information input by the secret information input module to an information processing apparatus connected to the device, a first identification information-supplying module for supplying the identification information to the information processing apparatus connected to the device, a second identification information-supplying module for supplying the identification information to an information processing apparatus currently connected to the device, in response to a request for reference to the secret information, and a result reception module for receiving a result of determination by the information processing apparatus connected to the device as to whether or not the identification information supplied by the first identification information-supplying module and the identification information supplied by the second identification information-supplying module match, from the information processing apparatus.

To attain the above object, in a sixth aspect of the present invention, there is provided a storage medium storing an information processing program as claimed in claim 11, in a computer-readable manner.

To attain the above object, in a seventh aspect of the present invention, there is provided a storage medium storing an information processing program as claimed in claim 12, in a computer-readable manner.

With the configuration of the second to seventh aspects of the present invention, the same advantageous effects as provided by the first aspect can be obtained. More specifically, by permitting a device which has set secret information into the information processing apparatus to refer to the secret information set in the information processing apparatus and inhibiting other devices than the device from referring to the secret information, it is possible to prevent the secret information from leaking via the other devices. Further, the permission or inhibition of reference to the secret information is determined from identification information on the device, whereby the control of reference to the secret information can be facilitated.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing preferred embodiments thereof.

Some of devices such as printers and multifunction peripherals are capable of operating with expanded capabilities by being connected with various cards as information processing apparatuses, such as expansion cards. In this case, the devices are required to operate in a manner compatible with the expansion cards connected thereto. However, the devices such as printers and multifunction peripherals do not have sufficient user interface. Therefore, it is not desirable to compel users or repair people to carry out the operation of changing the firmware of the device into one compatible with a newly connected expansion card or the operation of installing an expansion card driver as in the case of PCs (Personal Computers), because this can cause troubles, such as the disabled operation of the device due to failure in the installation. To make the device compatible with various expansion cards without changing the firmware of the device, it is necessary that the device can access any expansion card connected thereto by the same method, and all information unique to the expansion card is held by the expansion card.

In a system having an expansion card for holding information which is secret (hereinafter referred to as "secret information"), such as a secret key, as described above, the present invention realizes the functions of permitting only a specific device to use and view the secret information, thereby preventing the use, view, or leakage of the secret information even if the card is connected to a device other than the specific device. The following description will be given by taking a wireless LAN card as an example of the expansion card, but the present invention does not limit the functions provided by the expansion card by any means.

Figure 1:
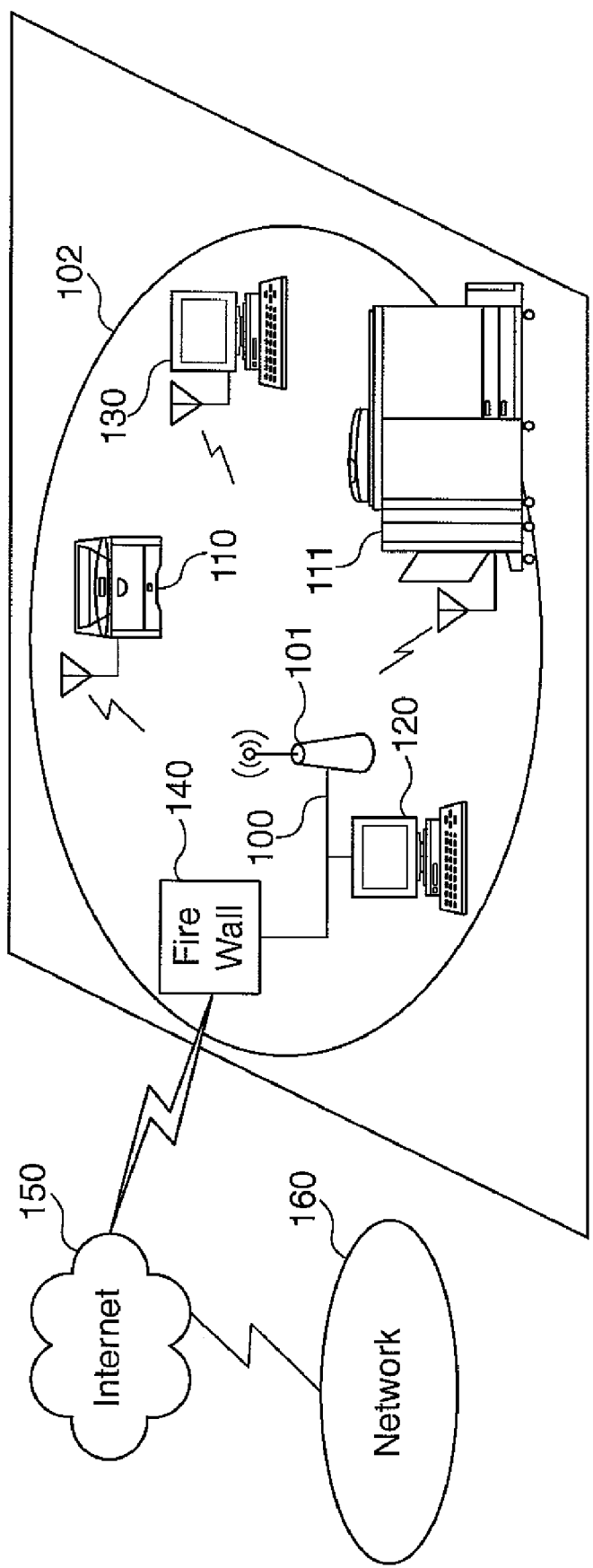
FIG. 1 is a diagram of the general configuration of an information processing system including an information processing apparatus and a device, according to a first embodiment of the present invention.

Hereinafter, a description will be given of a first embodiment of the present invention. FIG. 1 is a diagram of the general configuration of an information processing system including an information processing apparatus and a device, according to the first embodiment of the present invention.

The preset information processing system is comprised of a single function printer (hereinafter referred to as "the SFP") 110, a multi-function printer (hereinafter referred to as "the MFP") 111, and a PC (Personal Computer) 130, which are connected to a wireless LAN (WLAN) 102 comprised of a wireless LAN access point (hereinafter referred to as "the AP") 101. The AP 101 and a PC 120 are connected to a LAN 100. The SFP 110 and the MFP 111 receive print jobs from the PC 130 via the wireless LAN 102 and execute print processing. Further, the SFP 110 and the MFP 111 are capable of receiving requests for configuration and operation from the PC 130, and operating according to the requests. Thus, they can be remotely configured and operated. Similarly to the case of the PC 130, the SFP 110 and MFP 111 receive print jobs from the PC 120 via the LAN 100 and the wireless LAN 102 and execute print processing. In addition, the SFP 110 and MFP 111 are capable of receiving requests for configuration and operation from the PC 120 and operating according to the requests, whereby they can be remotely configured and operated.

A firewall 140 connects the LAN 100 to an Internet 150 outside the LAN 100. Further, the LAN 100 is connected to another network 160 via the firewall 140 and the Internet 150.

Figure 2:
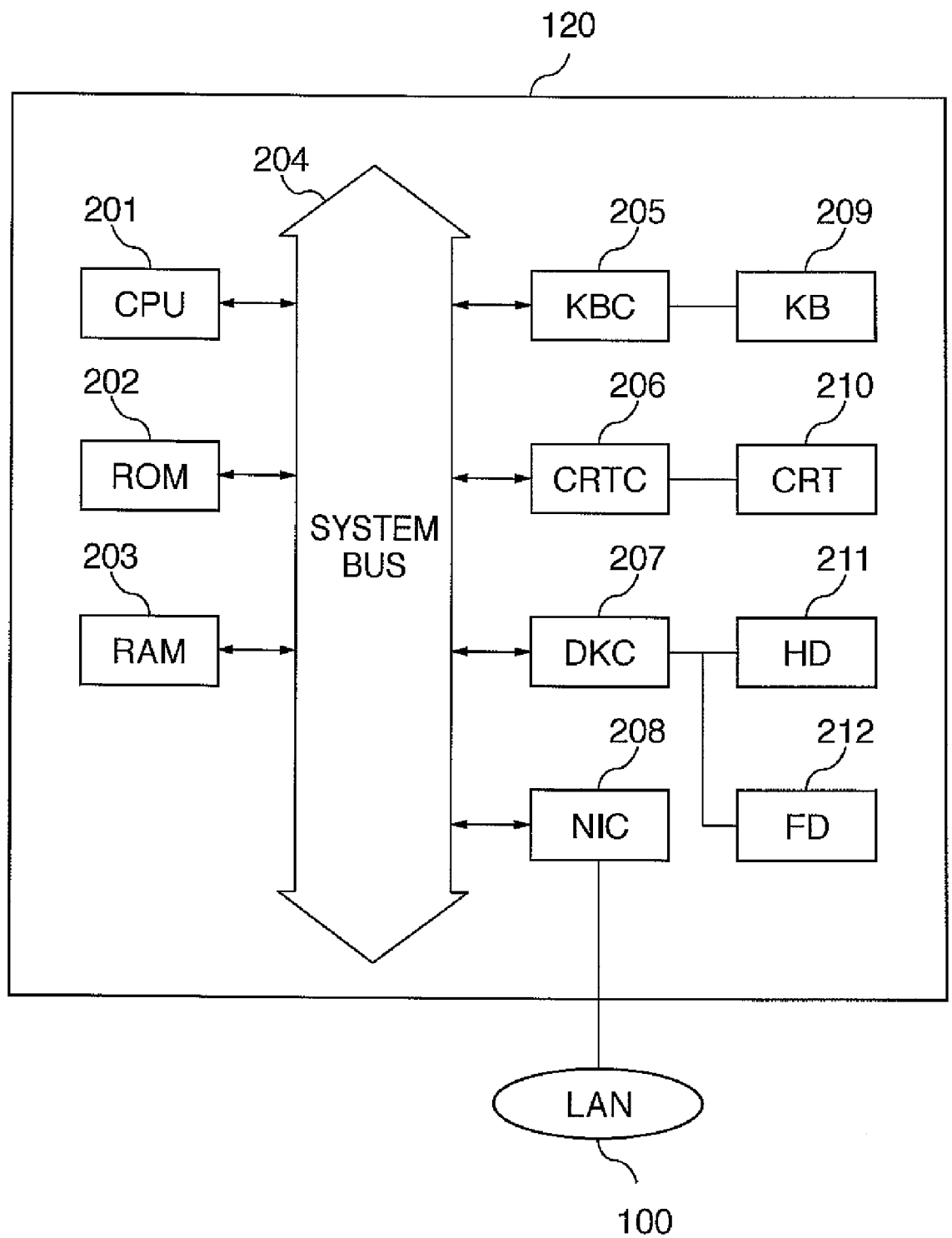
FIG. 2 is a block diagram of the internal configuration of a PC (personal computer) appearing in FIG. 1.

FIG. 2 is a block diagram of the internal configuration of the PC 120. The PC 130 is configured similarly to the PC 120, and the two PCs 120 and 130 have the same configuration as a general personal computer. The description of the internal configuration of the CP 130 is omitted.

The PC 120 includes a CPU 201 that carries out various pieces of software stored in a ROM 202 or a hard disk (HD) 211 or supplied from a floppy (registered trademark) disk drive (FD) 212. The CPU 201 provides overall control of various pieces of equipment connected to a system bus 204. The hard disk 211 and the floppy (registered trademark) disk drive 212 store a boot program, various applications, edited files, user files, etc.

A RAM 203 functions as a main memory, a work area, and the like of the CPU 201. A keyboard controller (KBC) 205 controls instruction inputs from a keyboard (KB) 209, a pointing device, not shown, and the like. A CRT controller (CRTC) 206 controls the display of a CRT display (CRT) 210. A disk controller (DKC) 207 controls access to the hard disk 211 and the floppy (registered trademark) disk drive 212. A network interface card (NIC) 208 sends and receives data to and from network printers, network equipment other than the network printers, and other PCs. In the case of the PC 130, the network interface card 208 thereof sends and receives data via the wireless LAN 102.

Figure 3:
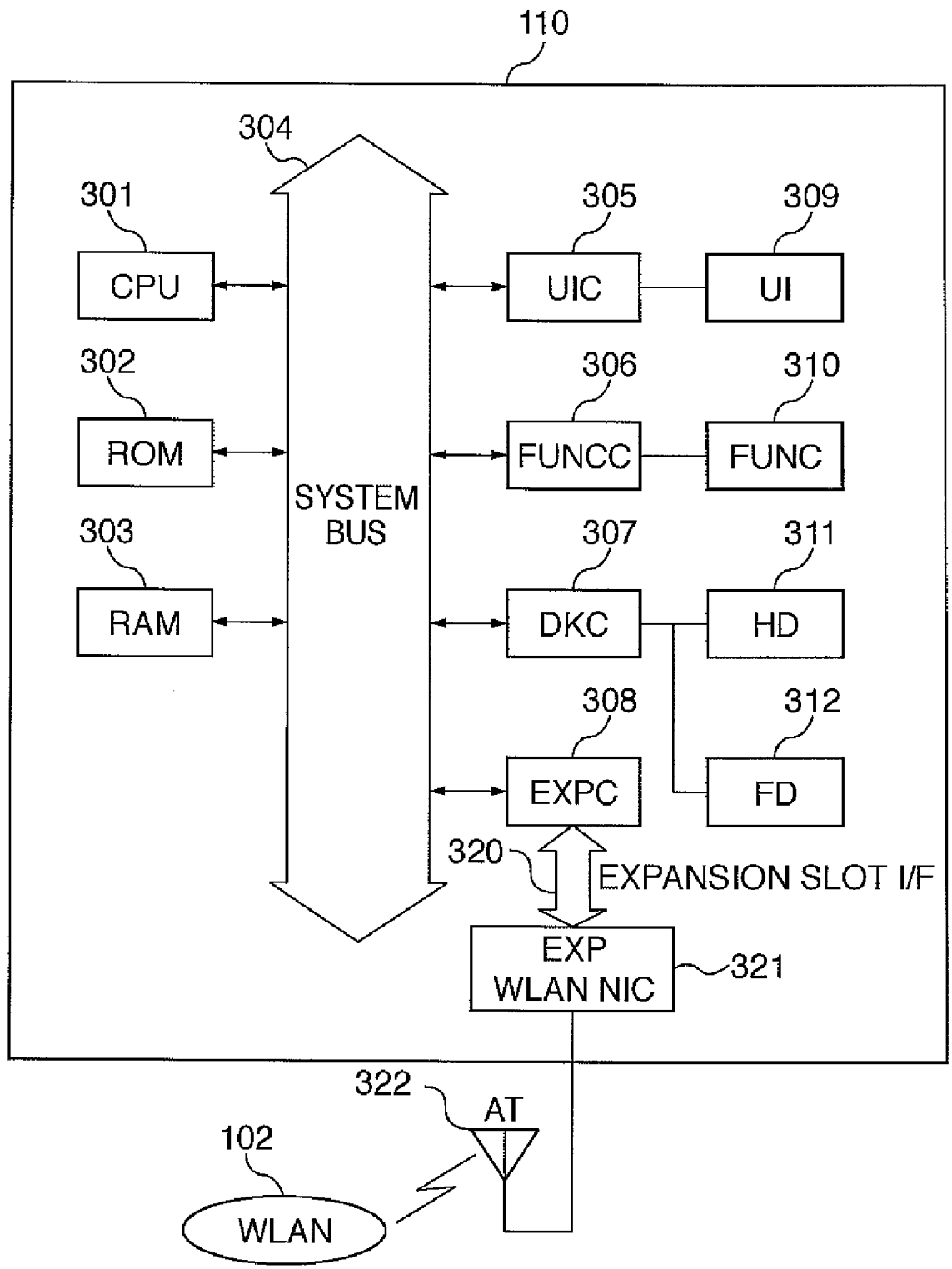
FIG. 3 is a block diagram of the internal configuration of an SFP appearing in FIG. 1.

FIG. 3 is a block diagram of the internal configuration of the SFP 110. The MFP 111 is configured similarly to the SFP 110, and hence the description thereof is omitted.

The SFP 110 includes a CPU 301 (a secret information-supplying section, a first identification information-supplying section, a second identification information-supplying section, a result reception section, a control section, and a secret information-setting request-reissuing section) that carries out various programs stored in a ROM 302 or a hard disk (HD) 311, or supplied from a floppy (registered trademark) disk drive (FD) 312. The CPU 301 provides overall control of various pieces of equipment connected to a system bus 304. The hard disk 311 and the floppy (registered trademark) disk drive 312 store a boot program, a "device-side main program" that carries out operations according to the invention, various applications, and data files.

A RAM 303 functions as a main memory, a work area, and the like of the CPU 301. A user interface (UI) 309 (a secret information input section) is provided with an operating panel (not shown) having a display section. A user interface controller (UIC) 305 controls the display of data on the user interface 309, and an instruction input from the user interface 309.

A function controller (FUNCC) 306 realizes/controls a function (FUNC) 310 as a device-specific function. For example, if the SFP 110 is a monochrome printer, the function controller 306 implements the functions of a monochrome print engine controller and a monochrome print engine, whereas if the SFP 110 is a color printer, the function controller 306 implements the functions of a color print engine controller and a color print engine. The MFP 111 is provided with the function controller 306 and the function 310 for each of the functions thereof.

A disk controller (DKC) 307 controls access to the hard disk 311 and the floppy (registered trademark) disk drive 312. An expansion slot controller (EXPC) 308 performs relay control between the system bus and an expansion card 321 (information processing apparatus) connected to an expansion slot I/F 320. There are a plurality of expansion cards 321. Different expansion cards 321 provide different functions to the SFP 110. Examples of the functions provided by the expansion cards are a wireless LAN function, a data encryption function, a PDL (Print Data Language) function, etc. In short, the SFP 110 is capable of having various expansion cards 321 connected thereto, and thereby obtaining the functions provided by the connected expansion cards 321.

The expansion card 321 appearing in FIG. 3 is a wireless LAN expansion card (EXP WLAN NIC) that provides a wireless LAN function. The expansion card 321 is connected to the wireless LAN 102 (WLAN) via an antenna (AT) 322, and sends and receives data to and from the network printers, network equipment other than the network printers, and other PCs.

Figure 4:
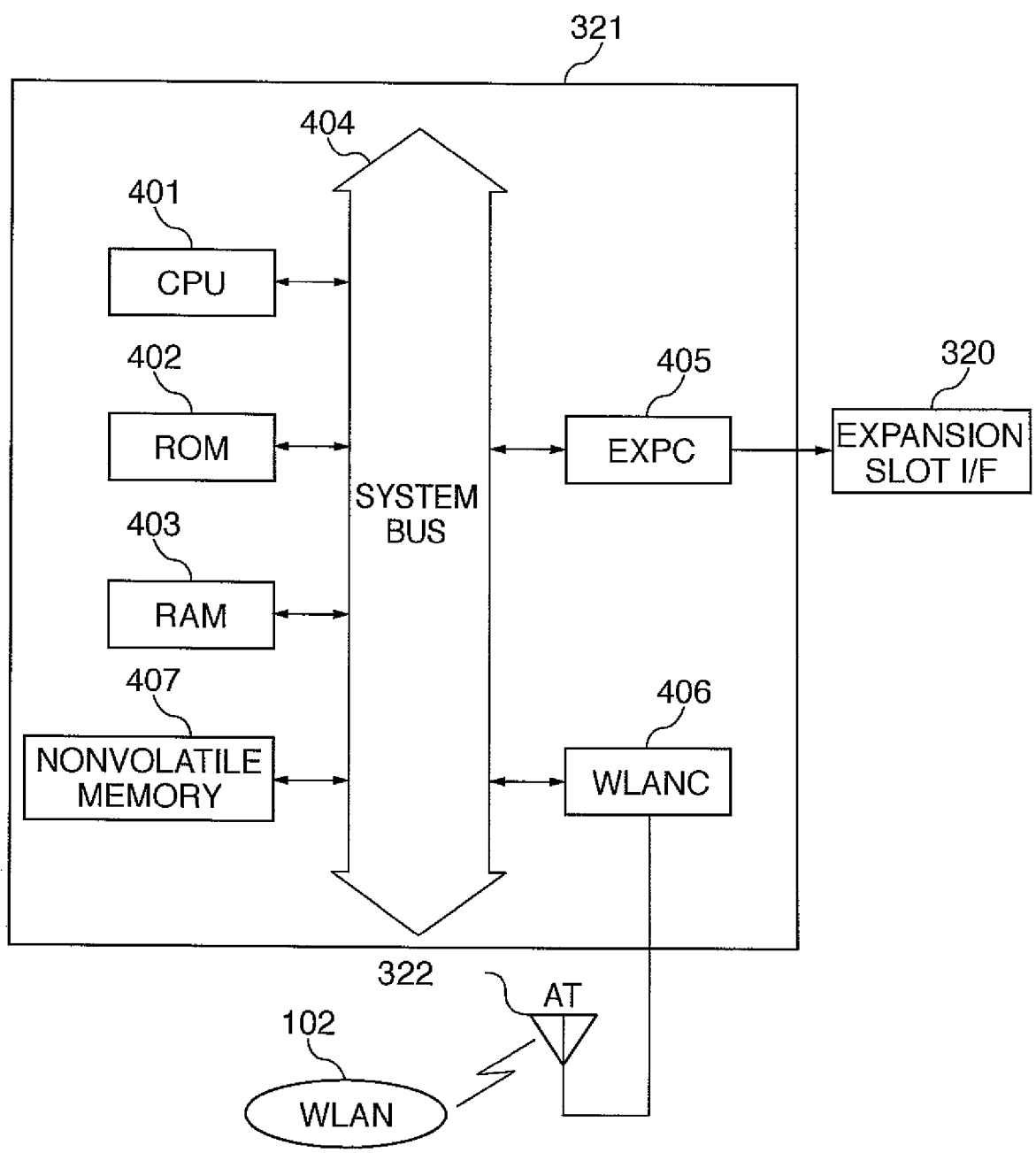
FIG. 4 is a block diagram of a wireless LAN card as a wireless LAN expansion card, appearing in FIG. 3.

FIG. 4 is a block diagram of the wireless LAN card 321 as the wireless LAN expansion card.

The wireless LAN card 321 can be connected to any of the SFP 110 and the MFP 111 appearing in FIG. 3, and provides the SFP 110 and the MFP 111 with the function of connection to the wireless LAN 102.

The wireless LAN card 321 includes a CPU 401 (a secret information-acquiring section, a first identification information-acquiring section, a second identification information-acquiring section, a determination section, and a control section) that carries out various programs stored in a ROM 402, and provides overall control of various pieces of equipment connected to a system bus 404. The ROM 402 also stores an "expansion card-side main program" that carries out operations according to the invention. A RAM 403 functions as a main memory, a work area, and the like of the CPU 401. An expansion slot controller (EXPC) 405 connects the wireless LAN card 321 to the expansion slot I/F 320 of devices such as the SFP 110 and the MFP 111 appearing in FIG. 3, and sends and receives data to and from the SFP 110 and the MFP 111. A wireless LAN controller (WLANC) 460 connects the wireless LAN card 321 to the wireless LAN (WLAN) 102 via the antenna (AT) 322, and sends and receives data to and from other network equipment and other PCs. A nonvolatile memory 407 is a memory such as a flash memory, which is rewritable and at the same time nonvolatile.

Figure 5:
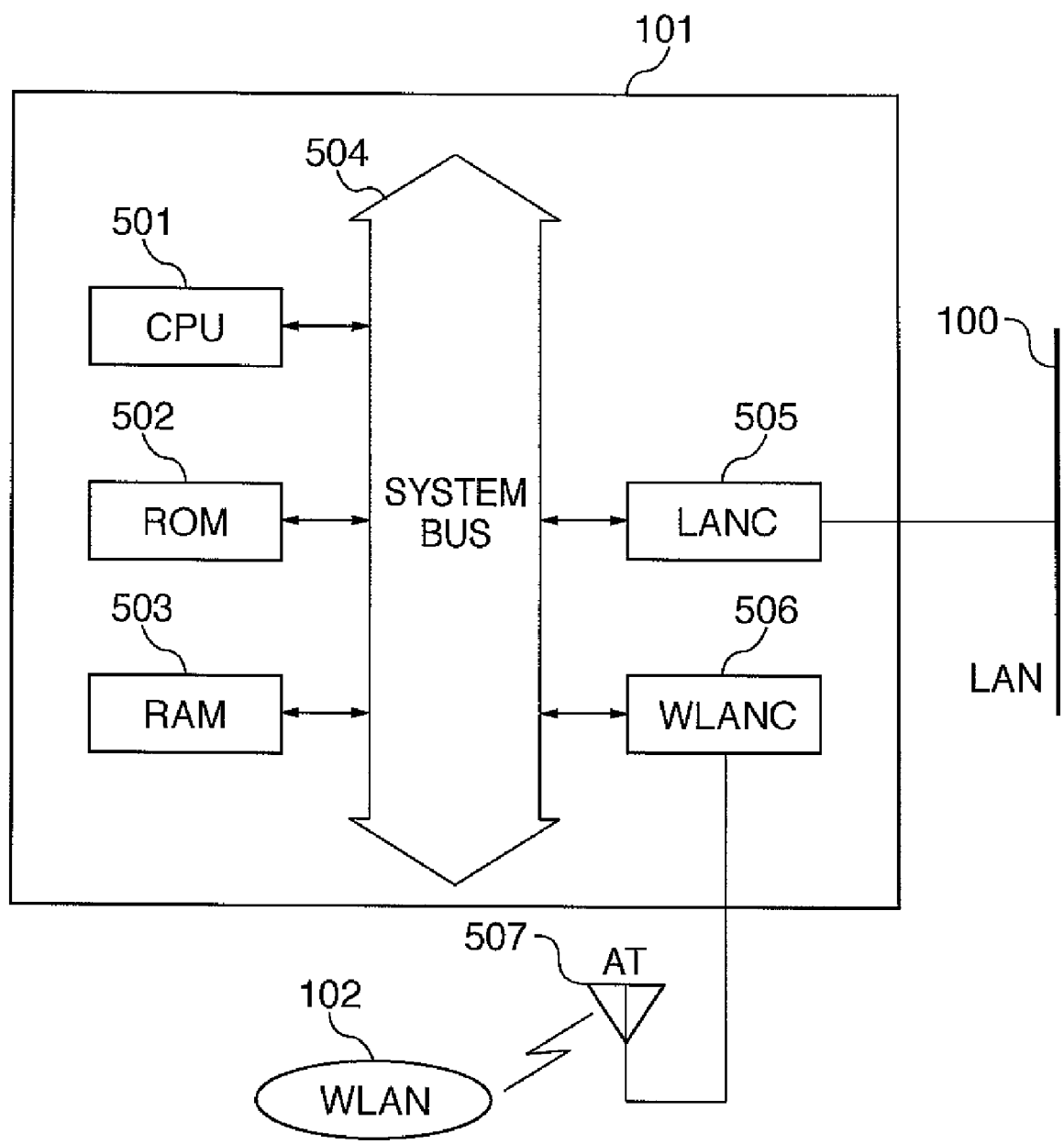
FIG. 5 is a block diagram of the internal configuration of an AP appearing in FIG. 1.

FIG. 5 is a block diagram of the internal configuration of the AP 101. The AP 101 has the same internal configuration as that of a general wireless LAN access point.

The AP 101 includes a CPU 501 that carries out various programs stored in a ROM 502 and provides overall control of various pieces of equipment connected to a system bus 504. A RAM 503 functions as a main memory, a work area, and the like of the CPU 501. A LAN controller (LANC) 505 sends and receives data to and from other network printers, other network equipment, and other PCs, via the LAN 100. A wireless LAN controller (WLANC) 506 connects the AP 101 to the wireless LAN (WLAN) 102 via an antenna (AT) 507, and sends and receives data to and from network printers, network equipment other than the network printers, and other PCs.

Figure 6:
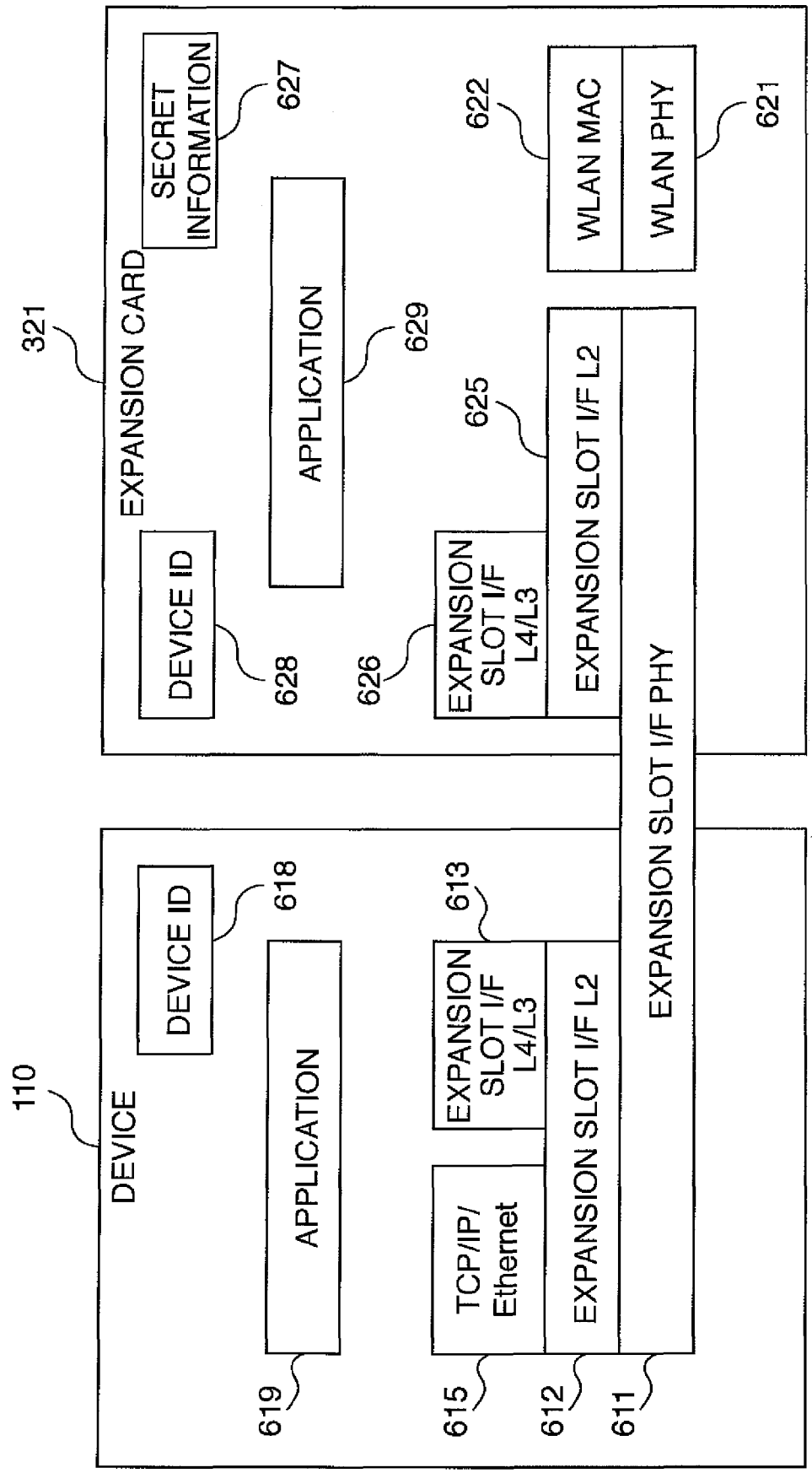
FIG. 6 is a view of a model formed by connecting the wireless LAN card as the wireless LAN expansion card to the SFP.

FIG. 6 is a view of a model formed by connecting the wireless LAN card 321 as the wireless LAN expansion card to the SFP 110. It should be noted that the wireless LAN card 321 can also be connected to the MFP 111, but a view of a model in this case is omitted.

The SFP 110 has a physical layer (PHY) 611 of an expansion slot I/F, and is physically combined with the expansion card 321. A second layer (L2) 612 and a fourth layer/third layer (L4/L3) 613 of the expansion slot I/F of the SFP 110 respectively correspond to a second layer (L2) 625 and a fourth layer/third layer (L4/L3) 626 of the expansion slot I/F on the expansion card 321.

Using the physical layer 611, the second layer 612, and the fourth layer/third layer 613 of the expansion slot I/F of the SFP 110 as well as the second layer 625 and the fourth layer/third layer 626 of the expansion slot I/F on the expansion card 321, bidirectional data transfer is performed between an application 619 of the SFP 110 and an application 629 of the expansion card 321. A TCP/IP Ethernet (registered trademark) 615 provides access to the wireless LAN for the user of the application 619 and the SFP 110, by using a WLAN NAC 622 and a WLAN PHY 621 of the expansion card 321 via the second layer 612 and the physical layer 611 of the expansion slot I/F.

The WLAN MAC 622 and the WLAN PHY 621 on the expansion card 321 provides the functions of the layer 2 and the layer 1 of the wireless LAN protocol, respectively, and these functions are specifically provided when the expansion card 321 is an wireless LAN expansion card. Secret information 627 is held by the expansion card 321. The user of the application 619 or the SFP 110 accesses the secret information 627 via the physical layer (PHY) 611, the second layer (L2) 612, and the fourth layer/third layer (L4/L3) 613 of the expansion slot I/F of the SFP 110 as well as the second layer (L2) 625 and the fourth layer/third layer (L4/L3) 626 of the expansion slot I/F on the expansion card 321, and the application 629.

Device IDs 618 and 628 are identification information for uniquely identifying the SFP 110. The device ID 618 is assigned to the SEP 110 when it is shipped. Through processes described hereinafter, the device ID 618 is passed from the SFP 110 to the expansion card 321, whereby the device ID 618 is made into the device ID 628. Although described in detail hereinafter, comparison between the device IDs 618 and 628 protects the secret information 627 from an unintended device. The same also applies to the case where the expansion card 321 is connected to the MFP 111.

Figure 7:
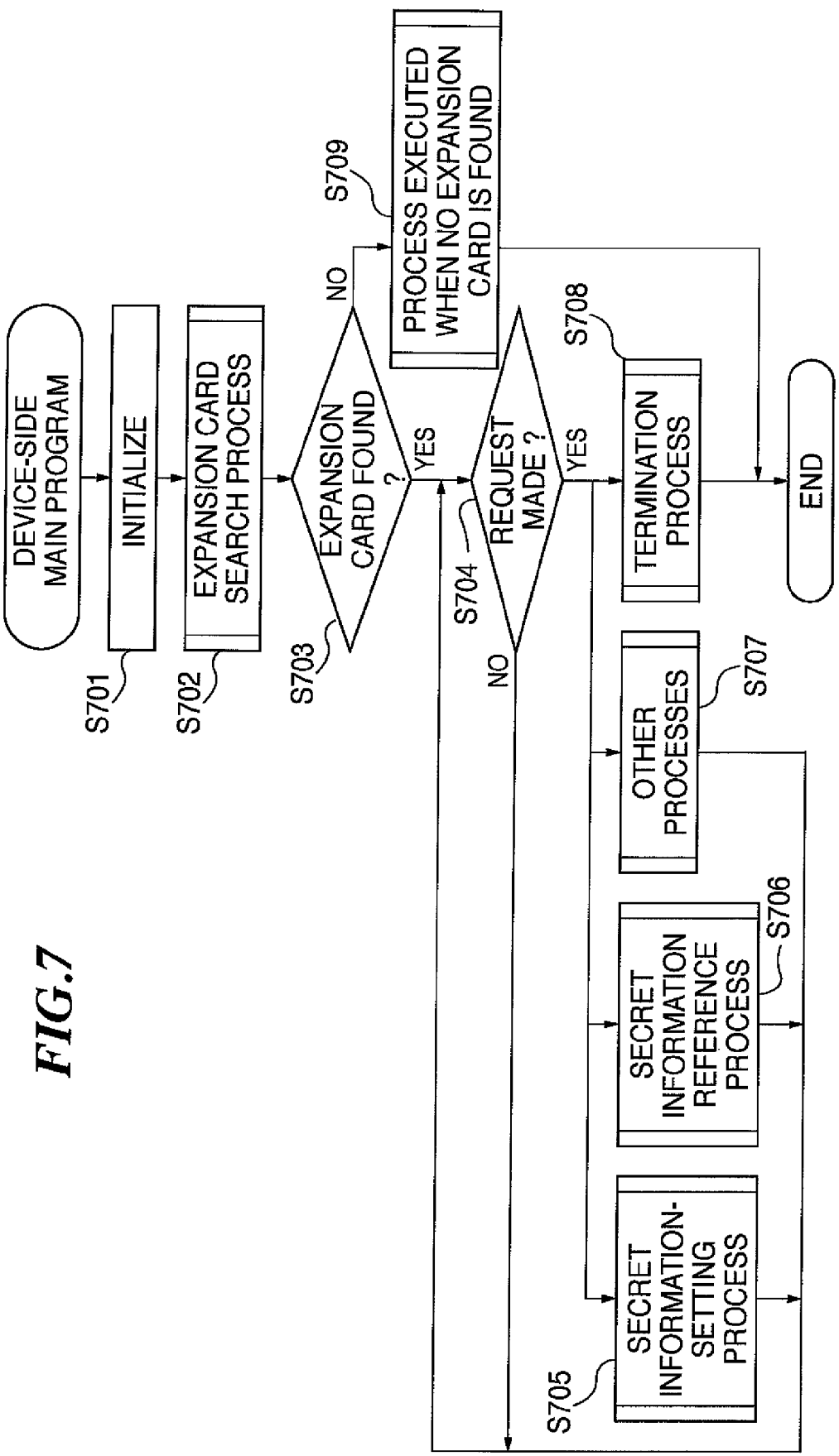
FIG. 7 is a flowchart of a device-side main program which is executed by devices such as the SFP and an MFP.

FIG. 7 is a flowchart of a device-side main program which is executed by devices such as the SFP 110 and the MFP 111. The present process is started when the power is turned on. The CPU 301 executes the device-side main program, whereby a device such as the SFP 110 or the MFP 111 operates according to the device-side main program.

First, the device-side main program executes initialization processing (step S701), and executes an expansion card search process (step S702) described hereinafter with reference to FIG. 9. Then, the device-side main program determines based on the results of the search process whether or not an expansion card is connected (step S703). If an expansion card is connected, the process proceeds to a step S704, whereas if no expansion card is connected, the process proceeds to a step S709. In the step S709, the device-side main program operates the device in the way predetermined for devices attached with no expansion card. The device-side main program is terminated according to a user's instructing operation or when it is determined that termination of the operation of the expansion card is necessary.

In the step S704, the device-side main program awaits a user's operation, a request from the PC 130 on the network appearing in FIG. 1, or a request from within the device-side main program. If a request is received, control is assigned to a corresponding one of the steps S705 to S708 according to the request.

More specifically, if the request is a secret information-setting request (installation request), the device-side main program proceeds to the step S705, whereas if the request is a secret information reference request, the device-side main program proceeds to a step S706. Further, if the request is a termination request, the device-side main program proceeds to a step S708, whereas if the request is other than the secret information-setting request, the secret information reference request, and the termination request, the device-side main program proceeds to a step S707. After processing in the corresponding one of the steps S705 to S707, the process returns to the step S704. In the step S708, the device-side main program carries out a termination process as required, whereby the present device-side main program is terminated.

In the step S705, the device-side main program executes a device-side secret information-setting process described hereinafter with reference to FIG. 11. In the step S706, the device-side main program executes a device-side secret information reference process described hereinafter with reference to FIG. 13.

Figure 8:
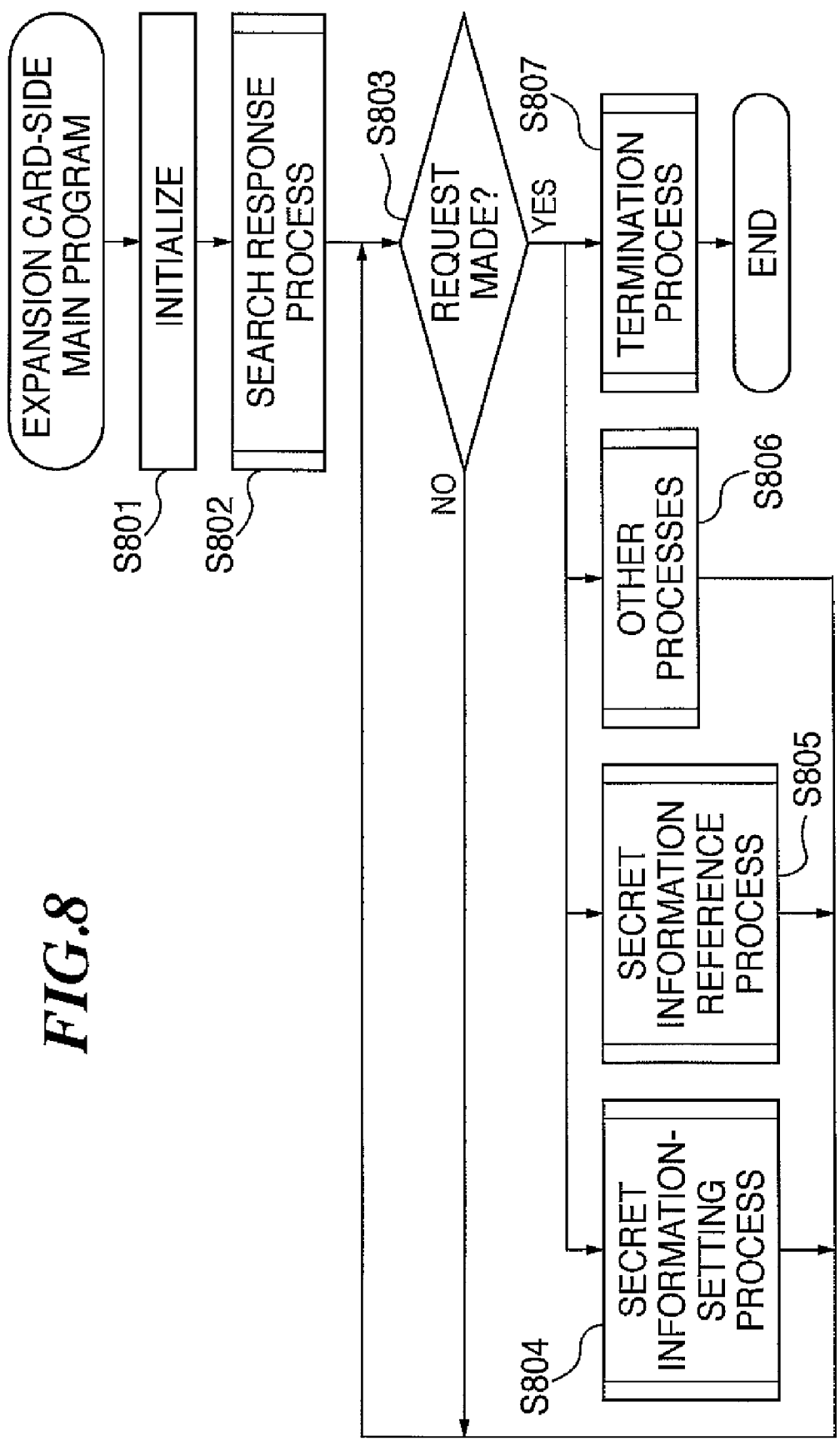
FIG. 8 is a flowchart of an expansion card-side main program which is executed by the expansion card connected to the devices such as the SFP and the MFP.

FIG. 8 is a flowchart of an expansion card-side main program which is executed by the expansion card 321 connected to a device such as the SFP 110 or the MFP 111. This process is executed when the power is turned on for the device, such as the SFP 110 or the MFP 111, to which the expansion card 321 is connected (hereinafter referred to as "the card equipped device"). The CPU 401 executes the expansion card-side main program whereby the expansion card 321 operates according to the expansion card-side main program.

First, the expansion card-side main program executes initialization processing (step S801), and a search response process described hereinafter with reference to FIG. 10 (step S802). Next, in a step S803, the expansion card-side main program awaits a request from within the expansion card-side main program or a request from the card equipped device, and if such a request is received, control is assigned to a corresponding one of the steps S804 to S807.

More specifically, when the received request is a secret information-setting request, the expansion card-side main program proceeds to the step S804, whereas if the request is a secret information reference request, the expansion card-side main program proceeds to a step S805. Further, if the request is a termination request, the expansion card-side main program proceeds to a step S807, whereas if the request is other than the secret information-setting request, the secret information reference request, and the termination request, the expansion card-side main program proceeds to a step S806. After performing the processing in the corresponding one of the steps S804 to S806, the expansion card-side main program returns to the step S803. In the step S807, the expansion card-side main program executes a termination process as required, whereby the expansion card-side main program is terminated.

In the step S804, the expansion card-side main program executes an expansion card-side secret information-setting process described hereinafter with reference to FIG. 12. In the step S805, the expansion card-side main program executes an expansion card-side secret information reference process described hereinafter with reference to FIG. 14.

Figure 9:
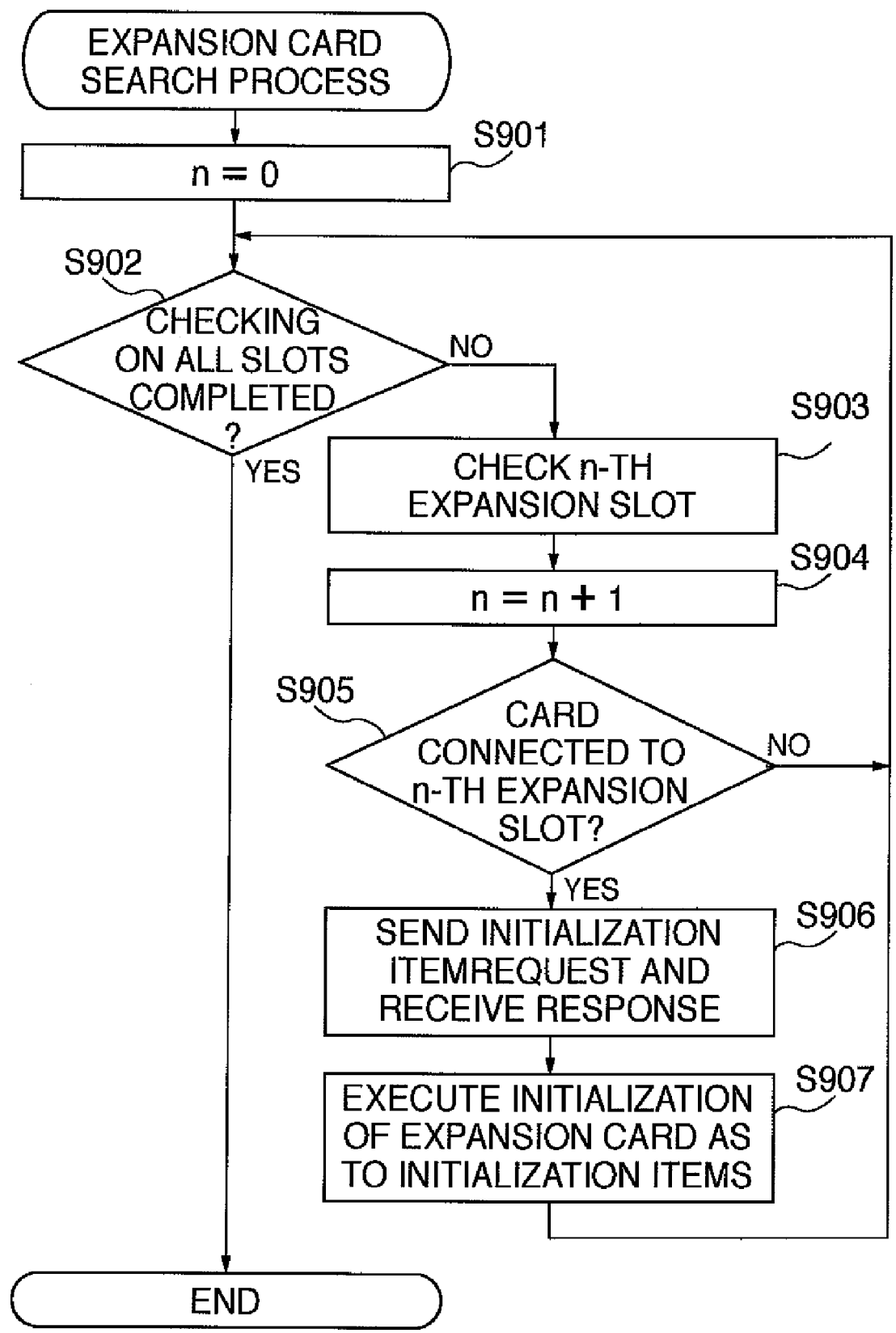
FIG. 9 is a flowchart of an expansion card search process executed in a step S702 in FIG. 7.

FIG. 9 is a flowchart of the expansion card search process executed in the step S702 in FIG. 7.

First, the device-side main program initializes a variable n to 0 (step S901), and then determines whether or not checking has been performed on all the expansion slot I/Fs 320 (FIG. 3) provided in the device (step S902). If the result of the determination shows that the checking on all the expansion slots has been completed, the device-side main program terminates the present process, whereas if there is an unchecked expansion slot, the device-side main program proceeds to a step S903.

In the step S903, the device-side main program checks a n-th one of the expansion slots assigned with the respective serial numbers, and increments the variable n by 1 (step S904). In the following step S905, the device-side main program determines, based on the results of the checking in the step S903, whether or not an expansion card is connected to the n-th one of the expansion slots. If no expansion card is connected, the device-side main program proceeds to the step S902. On the other hand, if an expansion card is connected, the device-side main program sends an initialization item request to the connected expansion card 321 (hereinafter, the expansion card 321 in the connected state is denoted as "the expansion card 321a"), and receives information indicative of initialization items as a response to the request (step S906). With this processing, the device-side main program obtains the information items to be set to the expansion card 321a.

Next, in a step S907, the device-side main program sends setting values for the information items to be set, i.e. the initialization items which are obtained in the step S906, thereby executing the initialization of the expansion card 321a. Then, the device-side main program returns to the step S902.

Figure 10:
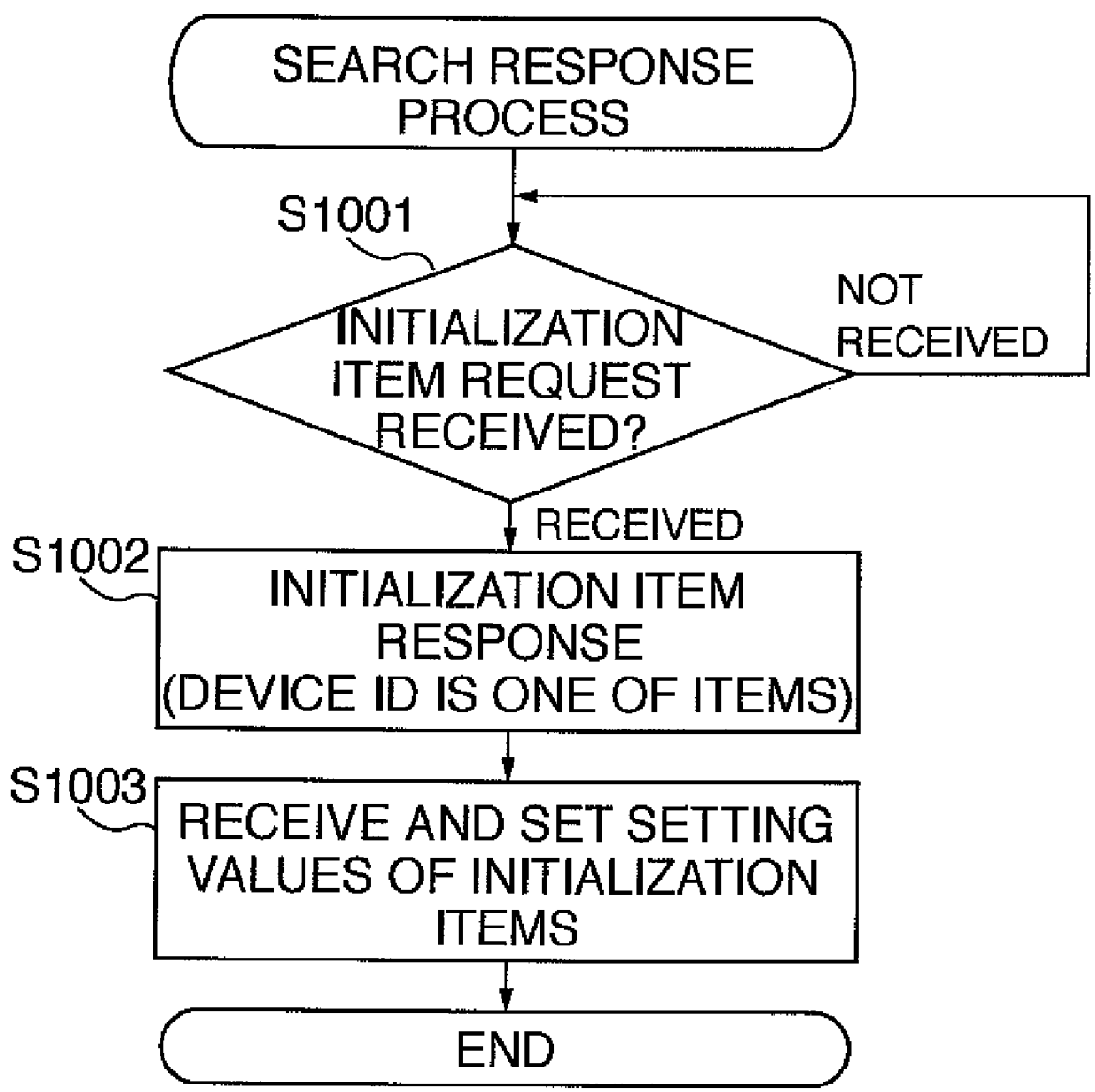
FIG. 10 is a flowchart of a search response process executed in a step S802 in FIG. 8.

FIG. 10 is a flowchart of a search response process executed in the step S802 in FIG. 8.

First, the expansion card-side main program awaits an initialization item request from the card equipped device (step S1001), and if an initialization item request is received, the expansion card-side main program proceeds to a step S1002. In the step S1002, the expansion card-side main program sends information indicative of initialization items as a response to the received initialization item request (initialization item response) back to the card equipped device. Here, the device ID 628 (see FIG. 6) is also one of the initialization items, and a DevInfoTmp section 1811 (initialization information storage section) appearing in FIG. 18A, referred to hereinafter, is initialized.

Next, in a step S1003, the expansion card-side main program receives setting values for the respective initialization items from the card equipped device, and configures the internal settings of the expansion card 321 according to the setting values. Then, the expansion card-side main program terminates the present process.

Figure 11:
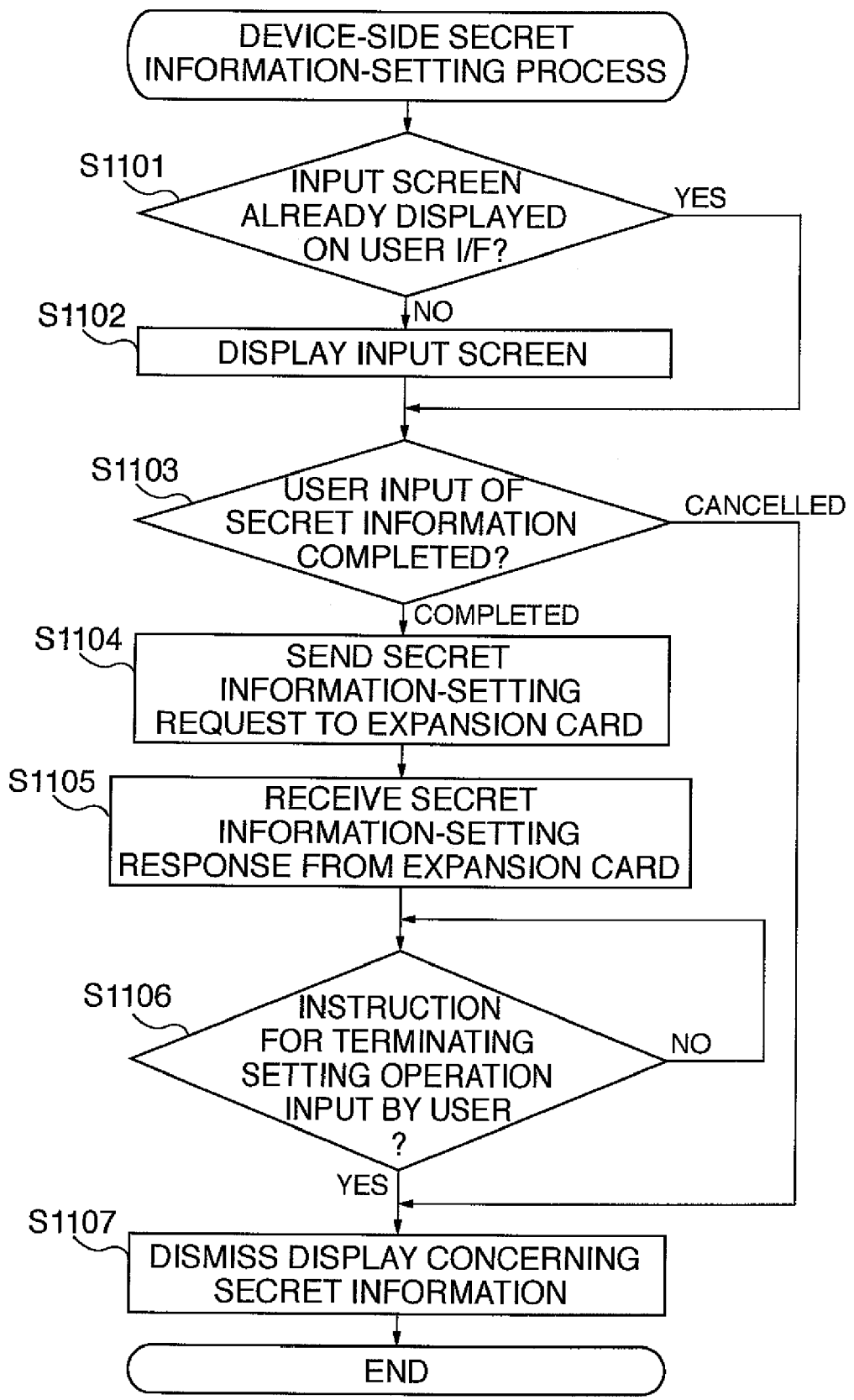
FIG. 11 is a flowchart of a device-side secret information-setting process executed in a step S705 in FIG. 7.

FIG. 11 is a flowchart of the device-side secret information-setting process executed in the step S705 in FIG. 7.

First, the device-side main program determines whether or not a screen for inputting secret information has been displayed on the user interface 309 (step S1101), if the screen has been displayed, the device-side main program proceeds to a step S1103. If the screen has not been displayed yet, the device-side main program displays the input screen (step S1102), and then proceeds to the step S1103.

In the step S1103, the device-side main program awaits user input of secret information via the user interface 309, and if an instruction for cancellation is input, the device-side main program proceeds to a step S1107. On the other hand, if the user input of secret information has been completed, the device-side main program sends the secret information-setting request to the expansion card 321a (step S1104). Details of the secret information-setting request will be described hereinafter with reference to FIG. 15.

Next, the device-side main program receives the secret information-setting response from the expansion card 321a (step S1105). Details of the secret information-setting response will be described hereinafter with reference to FIG. 17. Then, the device-side main program awaits user input instructing termination of the setting operation (step S1106), and if the instruction for terminating the setting operation is input, the device-side main program proceeds to the step S1107. In the step S1107, the display concerning the secret information input is dismissed, and then the device-side main program terminates the present process.

Next, a description will be given of the requests and response messages.

Figure 15:
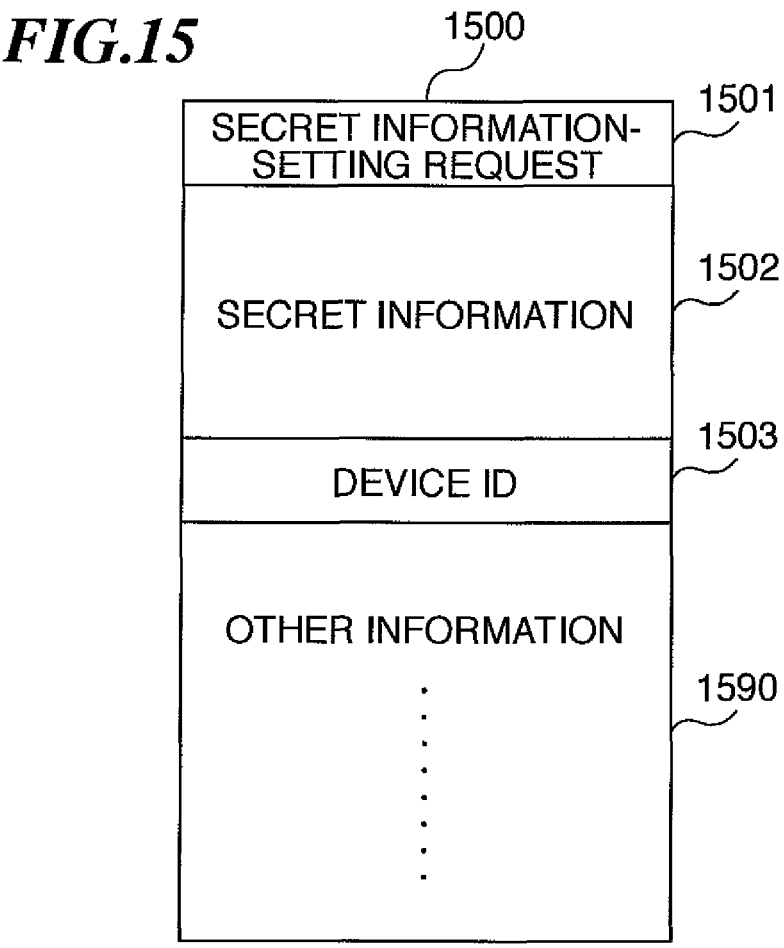
FIG. 15 is a conceptual diagram of the configuration of a message of a secret information-setting request.

FIG. 15 is a conceptual diagram of the configuration of a message of the secret information-setting request. The secret information-setting request 1500 is sent from the card equipped device to the expansion card 321a when the card equipped device sets its secret information into the expansion card 321a.

As shown in FIG. 15, the secret information-setting request 1500 includes an area 1501 for storing an identifier indicating that the request 1500 is a secret information-setting request, and an area 1502 for storing various items of information such as secret information. A device ID is stored in an area 1503. The device ID is an identifier which is assigned to each device when the device is factory-shipped as described above, for uniquely representing the device. Therefore, in the area 1503, a device ID 618 of the card equipped device is stored. Information other than the above is stored in an area 1590.

Figure 16:
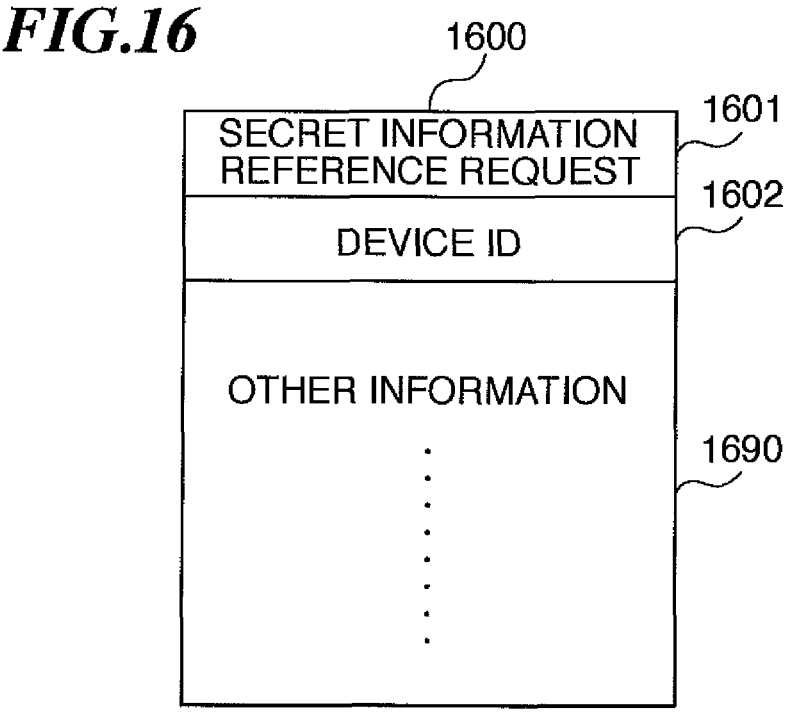
FIG. 16 is a conceptual diagram of the configuration of a message of a secret information reference request.

FIG. 16 is a conceptual diagram of the configuration of a message of the secret information reference request. The secret information reference request 1600 is sent from the card equipped device to the expansion card 321a when the card equipped device desires to view or use the secret information in the expansion card 321a. Alternatively, when a need for referring to the secret information arises from within the expansion card 321a, the secret information reference request 1600 is generated in the expansion card 321a and is issued for processing. As shown in FIG. 16, the secret information reference request 1600 includes an area 1601 for storing an identifier indicating that the request 1600 is a secret information reference request, and an area 1602 for storing a device ID (device ID 618 of the card equipped device). Information other than the above is stored in an area 1690.

Figure 17:
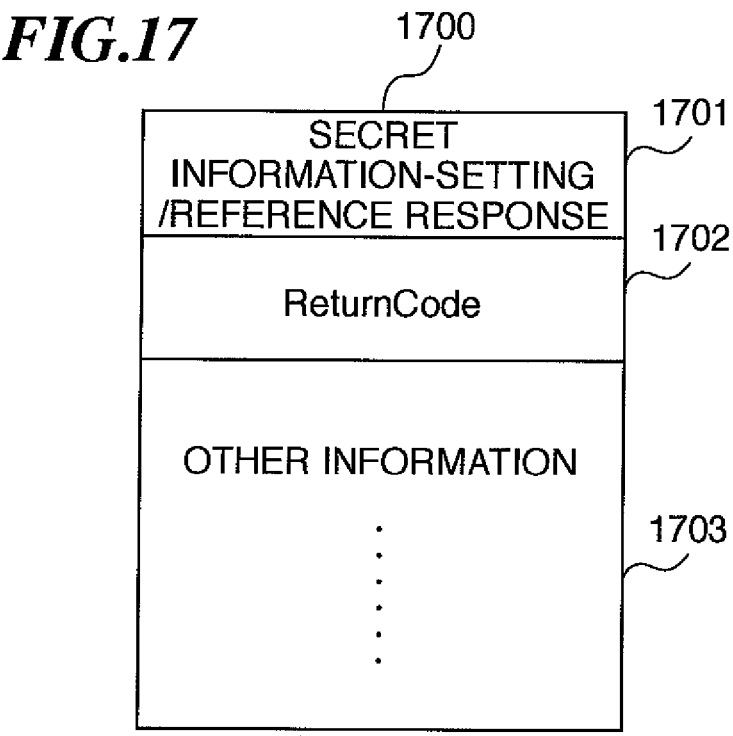
FIG. 17 is a conceptual diagram of the configuration of a message of a secret information-setting/reference response.

FIG. 17 is a conceptual diagram of the configuration of a message of a secret information-setting/reference response. The secret information-setting/reference response 1700 is sent from the expansion card 321a to the card equipped device as a response to a corresponding one of the secret information-setting request 1500 and the secret information reference request 1600, i.e. as a secret information-setting response and a secret information-reference response. As shown in FIG. 17, the secret information-setting/reference response 1700 stores an identifier indicating that the response 1700 is a secret information-setting response when the received request is the secret information-setting request 1500, and an identifier indicating that the response 1700 is a secret information reference response when the request is the secret information reference request 1600, in an area 1701. A return code (ReturnCode) is stored in an area 1702. The return code includes success, failure, and secret information reference permission and inhibition codes. Information other than the above is stored in an area 1703.

Figure 18A:
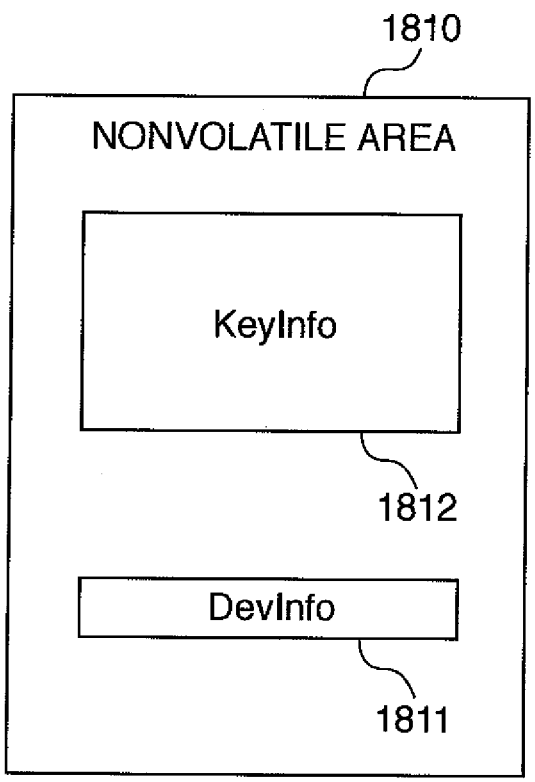
FIG. 18A is a diagram of a storage area of a nonvolatile memory of the expansion card.
Figure 18B:
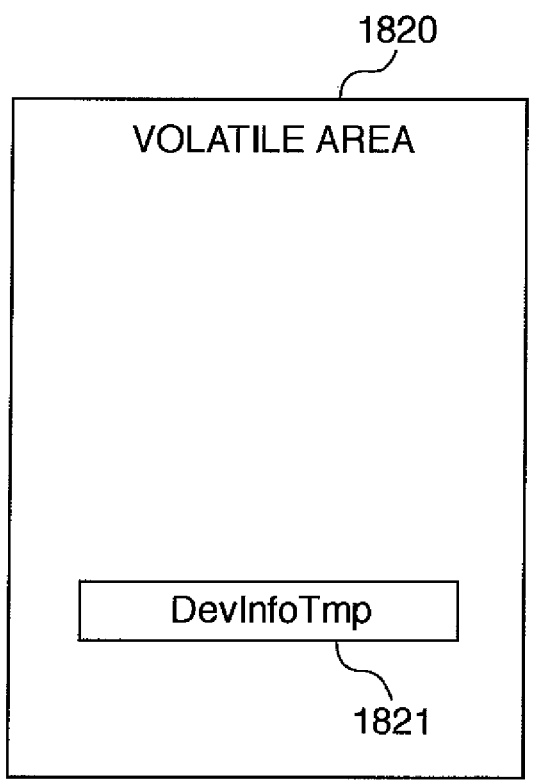
FIG. 18B is a diagram of a storage area of a RAM of the expansion card.

FIG. 18A is a diagram of a storage area of a nonvolatile memory 407 of the expansion card 321, and FIG. 18B is a diagram of a storage area of the RAM 403 of the expansion card 321. A nonvolatile area 1810 in FIG. 18A is formed in the nonvolatile memory 407, and a volatile area 1820 appearing in FIG. 18B is formed in the RAM 403 (see FIG. 4). The nonvolatile area 1810 includes a KeyInfo section 1812 (secret information storage section) and the DevInfo section 1811 as respective storage areas.

The DevInfo section 1811 is an area for storing a device ID, and when a secret information-setting request is made by the card equipped device, the DevInfo section 1811 stores the device ID set in the message of the request. The KeyInfo section 1812 is an area for storing secret information, and when the secret information-setting request is made by the card equipped device, the KeyInfo section 1812 stores the secret information set in the message of the request as the secret information 627 (see FIG. 6). As the secret information 627, information input to the card equipped device which has sent the secret information-setting request is stored in the KeyInfo section 1812, and hence the secret information 627 is updated whenever a secret information-setting request is made.

The volatile area 1820 includes a DevInfoTmp section 1821 which is set by initialization executed when the power of the card equipped device is turned on. When a secret information-setting request or a secret information reference request is made by the card equipped device, the DevInfoTmp section 1821 stores the device ID set in the message of the request.

Figure 12:
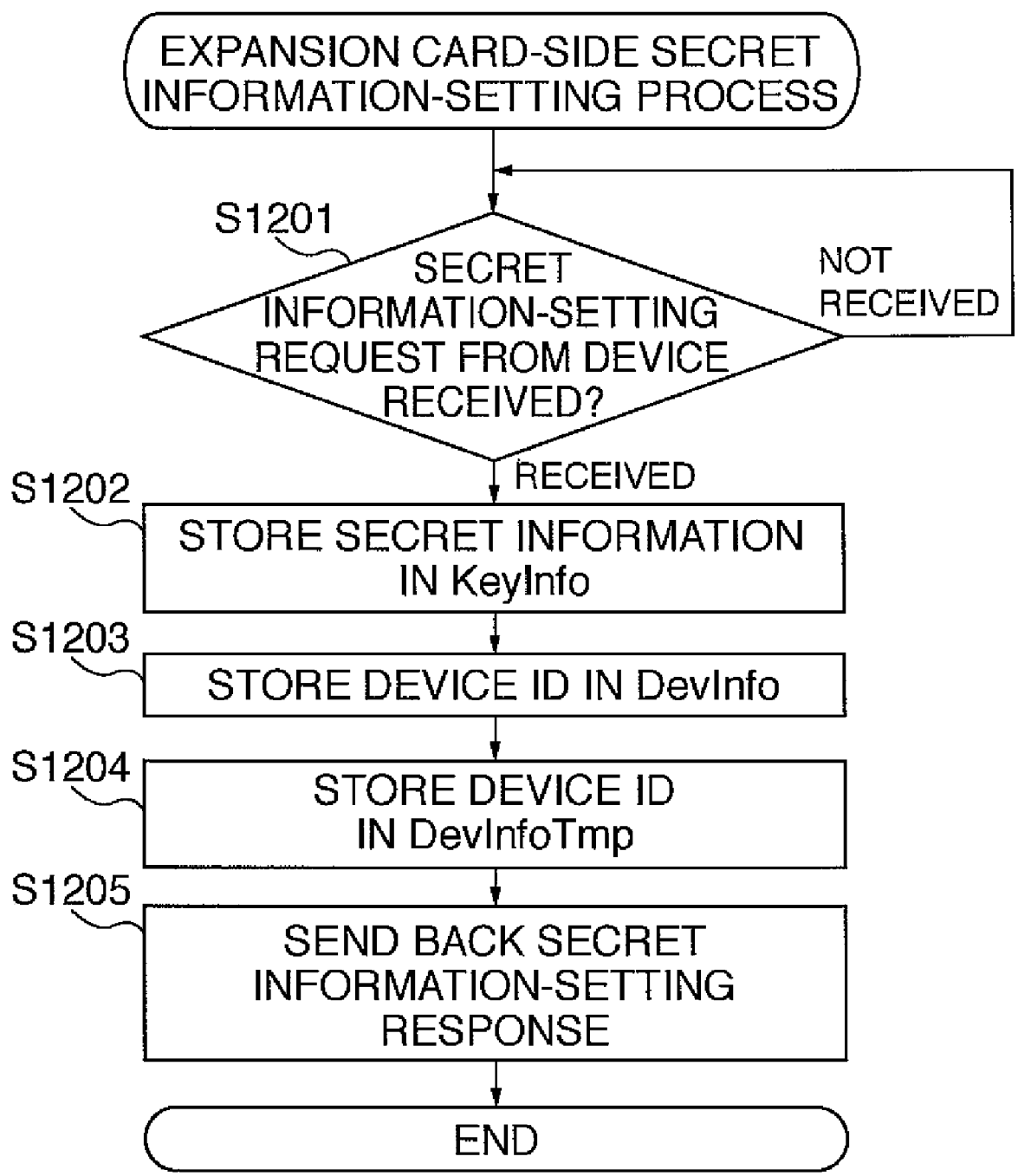
FIG. 12 is a flowchart of an expansion card-side secret information-setting process executed in a step S804 in FIG. 8.

FIG. 12 is a flowchart of the expansion card-side secret information-setting process executed in the step S804 in FIG. 8. In FIG. 12, first, the expansion card-side main program awaits completion of the reception of the secret information-setting request 1500 (see FIG. 15) from the card equipped device (step S1201). After completion of the reception of the secret information-setting request 1500, the expansion card-side main program extracts secret information from the received secret information-setting request 1500, and stores the same in the KeyInfo section 1812 (see FIG. 18A). Next, the expansion card-side main program extracts the device ID from the above-mentioned secret information-setting request 1500, and stores the same in the DevInfo section 1811 (step S1203), as well as stores the same in the DevInfoTmp section 1821 (see FIG. 18B) (step S1204). Next, the expansion card-side main program sends the secret information-setting response back to the card equipped device (step S1205), followed by terminating the present process.

Figure 13:
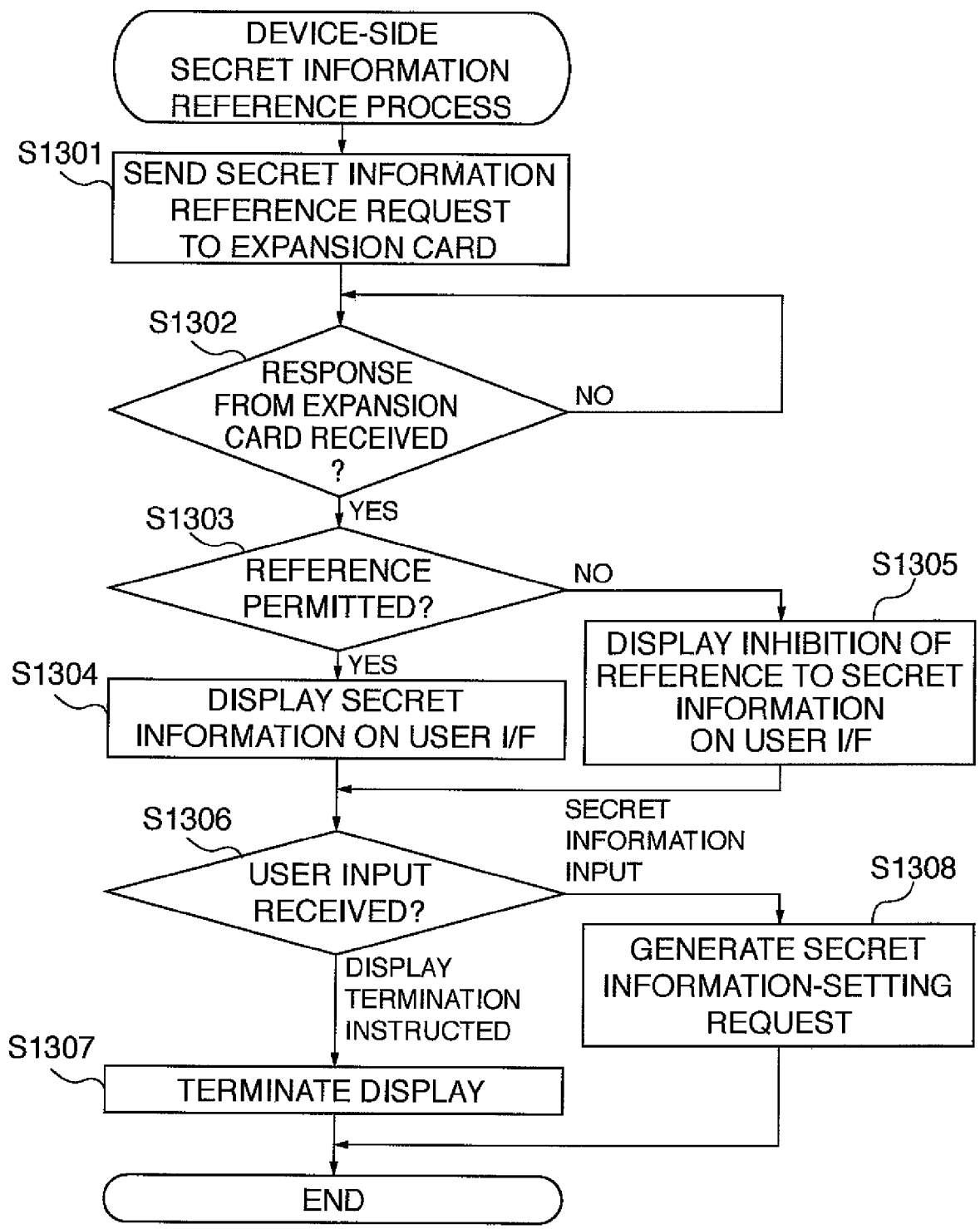
FIG. 13 is a flowchart of a device-side secret information reference process executed in a step S706 in FIG. 7.

FIG. 13 is a flowchart of the device-side secret information reference process executed in the step S706 in FIG. 7. In FIG. 13, first, the device-side main program sends the secret information reference request 1600 (see FIG. 16) to the expansion card 321a (step S1301), and awaits a response from the expansion card 321a to the sent secret information reference request 1600 (step S1302). Then, if the device-side main program receives the secret information reference response from the expansion card 321a, it determines based on the return code in the secret information reference response whether or not reference to the secret information is permitted (step S1303). As a result, if it is determined that the reference to the secret information is permitted, the device-side main program proceeds to a step S1304, whereas if the reference is not permitted, the device-side main program proceeds to a step S1305.

In the step S1304, the device-side main program refers to the secret information 627 in the expansion card 321a, and causes the user interface 309 to display the secret information 627. In the step S1305, the device-side main program causes the user interface 309 to display a message that the secret information is not permitted to be used. By these operations, it is possible to notify the user of the permission/inhibition of view and use of the secret information. The manners of display in the steps S1304 and S1305 will be described hereinafter with reference to FIGS. 20 and 21. After performing the processing in the step S1304 or S1305, the device-side main program proceeds to a step S1306.

In the step S1306, the device-side main program awaits user input in response to the information displayed in the step S1304 or the step S1305. Then, if the termination of the display is instructed, the device-side main program terminates the display of the secret information (step S1307), followed by terminating the present process. On the other hand, if secret information is input, the device-side main program newly generates a secret information-setting request (step S1308), followed by terminating the process. The secret information-setting request generated in the step S1308 is processed by the device-side secret information-setting process described hereinabove with reference to FIG. 11 and by the associated expansion card-side secret information-setting process described hereinabove with reference to FIG. 12.

Figure 14:
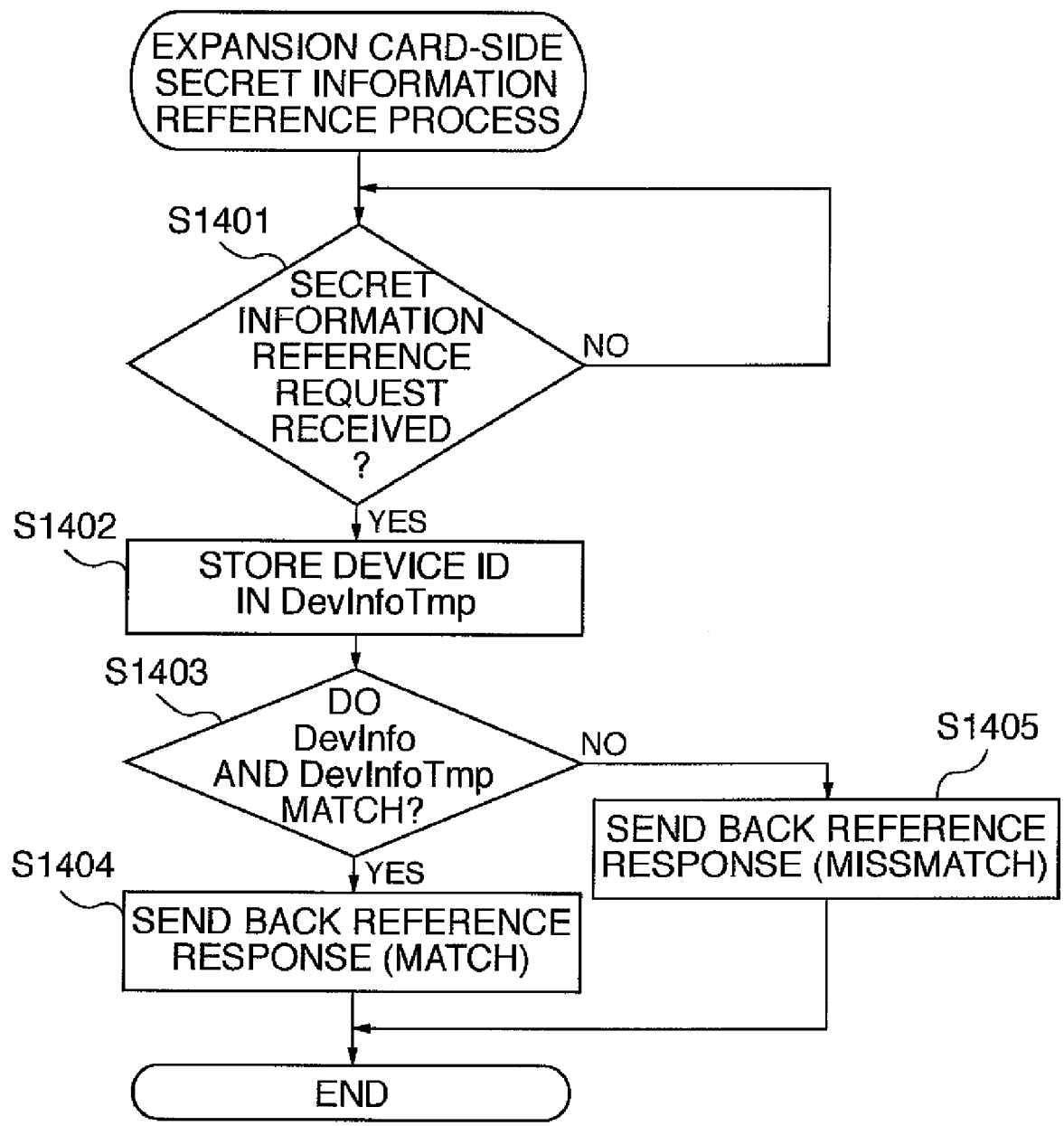
FIG. 14 is a flowchart of an expansion card-side secret information reference process executed in a step S805 in FIG. 8.

FIG. 14 is a flowchart of the expansion card-side secret information reference process executed in the step S805 in FIG. 8. In FIG. 14, first, the expansion card-side main program determines whether or not the reception of the secret information reference request 1600 (see FIG. 16) from the card equipped device is completed (step S1401). As a result, if it is determined the reception of the secret information reference request 1600 is completed, the expansion card-side main program causes the device ID set in the secret information reference request 1600 to be stored in the DevInfoTmp section 1821 of the volatile area 1820 (see FIG. 18B) (step S1402).

Next, the expansion card-side main program compares the device ID stored in the DevInfo section 1811 with the device ID stored in the DevInfoTmp section 1821 of the nonvolatile area 1810, and determines whether or the two device IDs match (step S1403) If the two match, the expansion card-side main program sends back to the card equipped device the secret information reference response indicating the permission of reference to the secret information 627 stored in the KeyInfo section 1812 (step S1404). In this case, the return code in the secret information reference response to be sent back is caused to contain information to the effect that the reference to the secret information 627 is permitted based on the match of the device IDs.

On the other hand, if the two device IDs do not match, the expansion card-side main program sends the secret information reference response indicating that the inhibition of the reference to the secret information 627 back to the card equipped device (step S1405). In this case, the return code in the secret information reference response to be sent back is caused to contain the information to the effect that the reference to the secret information 627 is inhibited due to the mismatch of the device IDs. After the processing in these steps, the expansion card-side main program terminates the present process.

According to the present process, the respective device IDs stored in the DevInfo section 1811 and the DevInfoTmp section 1821 are compared with each other, and if the two match, the secret information 627 stored in the KeyInfo section 1812 is permitted to be used to thereby realize the expanded function. On the other hand, if the two do not match, the secret information is not permitted to be used to thereby protect the secret information 627.

Figure 19:
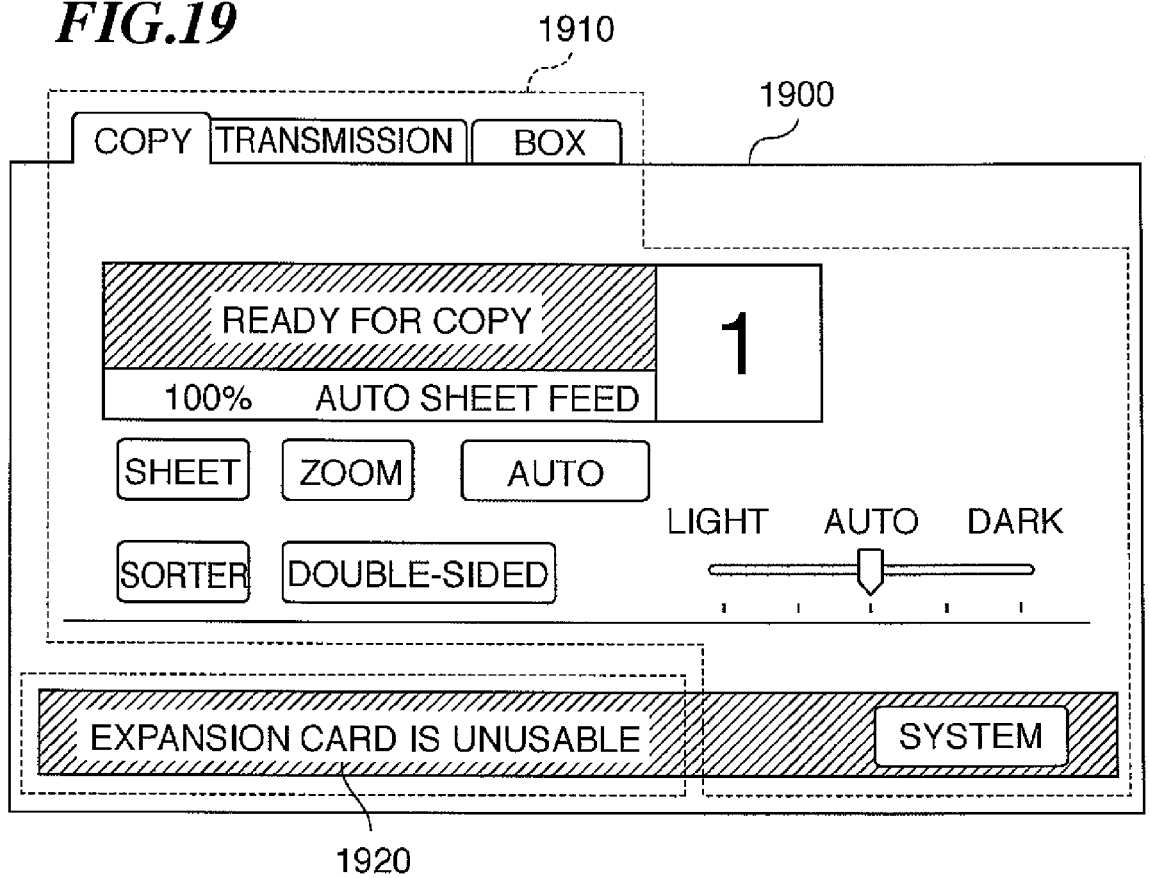
FIG. 19 is a diagram showing an example of a screen displayed on a display section of a user interface of a card equipped device.

FIG. 19 is a diagram showing an example of a screen displayed on the display section of the user interface 309 of the card equipped device. A display screen 1900 shown in FIG. 19 is an example of the screen displayed when a copying operation is attempted when the reference to the secret information 627 is not permitted. In the display screen 1900, a display content 1910 is the same as displayed when a normal copying operation is carried out. A display content 1920 is one concerned with the present invention. In the illustrated example, the card amounted device is not permitted to view or use the secret information 627, and hence a message "Use of expansion card is not permitted." is shown to the user.

Figure 20:
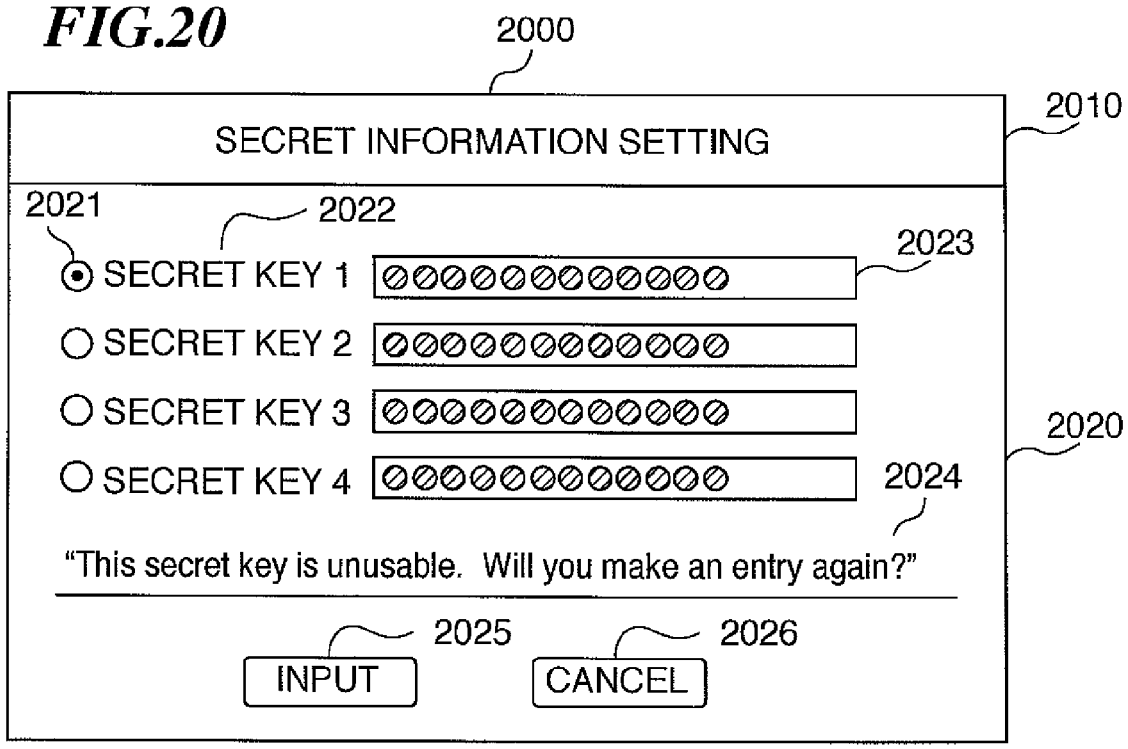
FIG. 20 is a diagram showing an example of a secret information-setting screen displayed on the display section of the user interface of the card equipped device.
Figure 21:
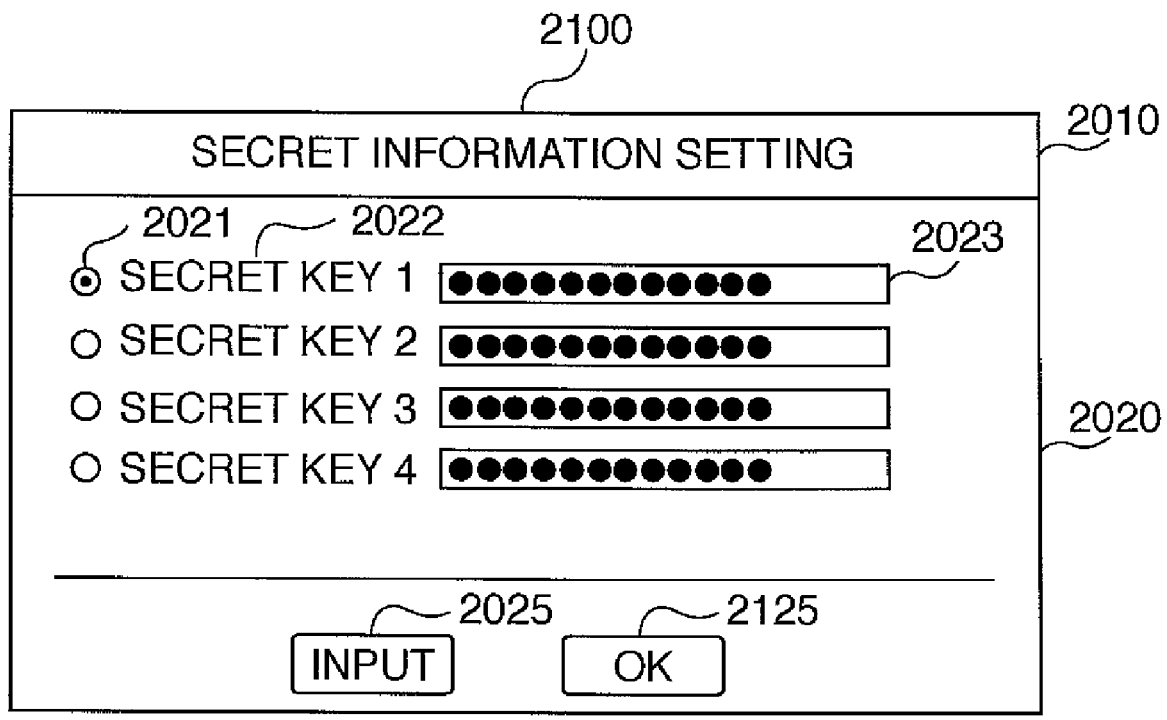
FIG. 21 is a diagram showing another example of the secret information-setting screen displayed on the display section of the user interface of the card equipped device.

FIGS. 20 and 21 are diagrams showing examples of a secret information-setting screen displayed on the display section of the user interface 309 of the card equipped device.

A secret information-setting screen 2000 shown in FIG. 20 is displayed e.g. in the step S1305 in FIG. 13. On the other hand, a secret information-setting screen 2100 shown in FIG. 21 is displayed e.g. in the step S1304 in FIG. 13.

In FIGS. 20 and 21, a display content 2010 shows the title of the screen. A display content 2020 is a setting operation screen, and in the illustrated examples, it is assumed that four secret keys can be set as the secret information. For each secret key, there are provided a content box 2023 for indicating a content of the secret key, a name box 2022 for indicating the name of the secret key, and a radio button 2021. Secret keys with radio buttons 2021 associated therewith are indicated to be ON are preferentially used.

In FIG. 20, a display content 2024 indicates a notification item. In the illustrated example, a message saying "This secret key is unusable. Will you make an entry again?" is displayed due to mismatch between the respective device IDs stored in the DevInfo section 1811 and the DevInfoTmp section 1821 illustrated in FIGS. 18A and 18B. In this case, the user can recognize that the secret information which should be displayed on the present secret information-setting screen, i.e. the secret information 627 held in the expansion card 321a should not be used by the card equipped device, but is protected from the device (leakage or unauthorized use is inhibited). Therefore, to further indicate to this effect, the display of the content boxes 2023 is grayed out. The button 2026 is pressed for terminating the display of the present setting screen.

On the other hand, in a secret information-setting screen 2100 shown in FIG. 21, the content box 2023 is not grayed out, but is normally displayed. Further, in the secret information-setting screen 2100, the content corresponding to the display content 2024 is not displayed yet. This is because the respective device IDs stored in the DevInfo section 1811 and the DevInfoTmp section 1821 match.

In this case, the secret information displayed on the secret information-setting screen 2100, i.e. the secret information 627 stored in the expansion card 321a is secret information input and configured (installed) by the card equipped device, and hence the user understands that the secret information is permitted to be used in the card equipped device alone, but not to be used by any other device. In the secret information-setting screen 2100, an OK button 2125 is depressed for terminating the display of the secret information-setting screen 2100.

Further, in the secret information-setting screens 2000 and 2100, a button 2025 is for shifting to an information input screen for inputting a secret key. The button 2025 in the secret information-setting screen 2000 shown in FIG. 20 is used for inputting new secret information, which makes it possible to cause a new secret information-setting request to be generated in the step S1308 in FIG. 13 even when referencing the secret information has once been prohibited. With this configuration, even if the card equipped device which is inhibited from referring to the secret information, the reference is permitted by executing a predetermined process. On the other hand, even if the reference to the secret information is permitted, by pressing the button 2025 in the secret information-setting screen 2100 appearing in FIG. 21, a secret information-setting request can be issued anew.

Figure 22:
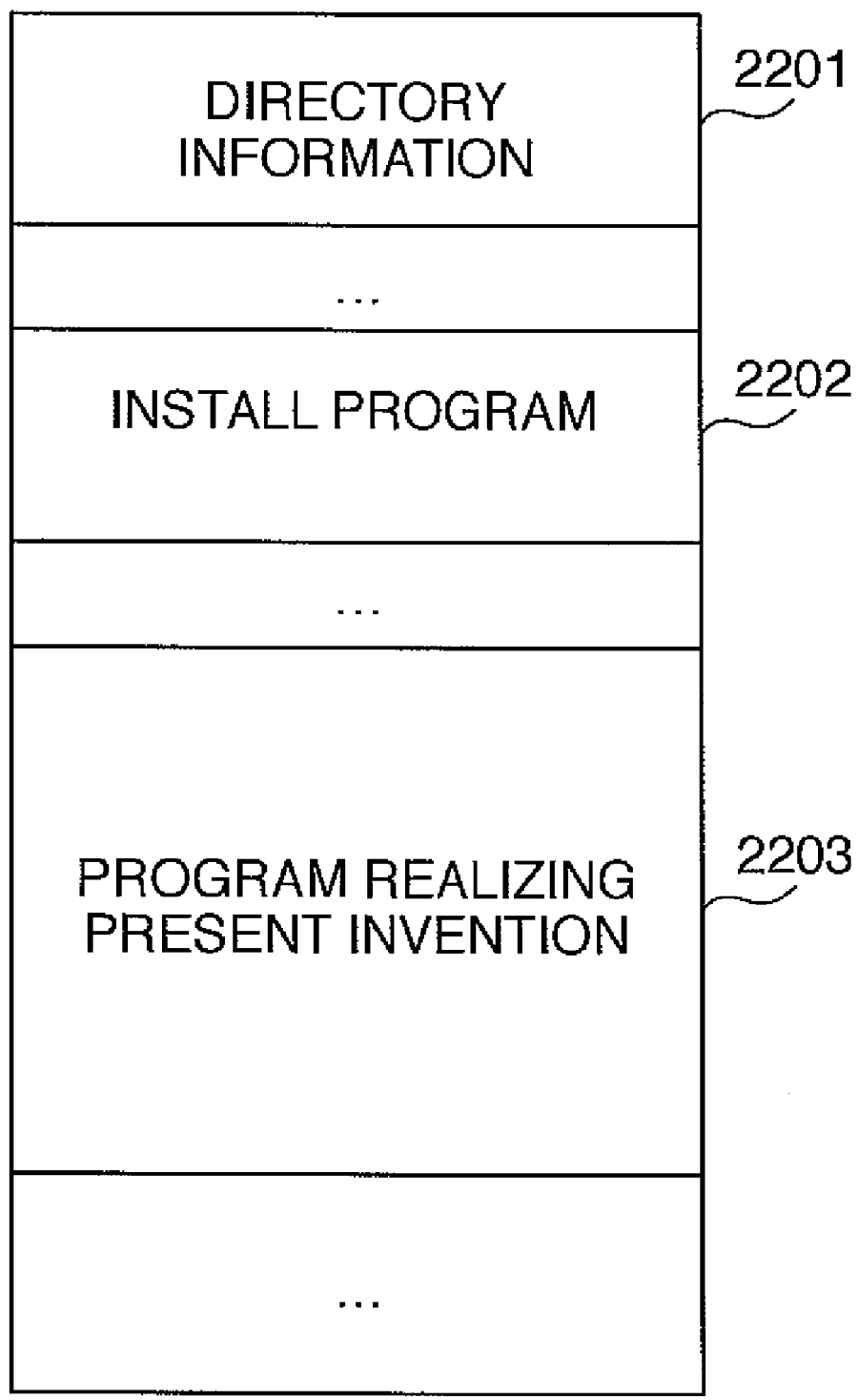
FIG. 22 is a diagram showing a memory map of a storage medium storing a program realizing the present invention.

FIG. 22 is a diagram showing a memory map of a storage medium storing a program realizing the present invention. This storage medium is a CD-ROM, for example.

In FIG. 22, an area 2201 stores directory information. A storage area 2202 stores an install program for installing a program (device-side main program (see FIG. 7)) realizing the present invention. An area 2203 stores the program realizing the present program. Directory information in the area 2201 indicates respective locations of the areas 2202 and 2203.

To install the program realizing the present invention in a device such as the SFP 110 or the MFP 111, first, the install program in the area 2202 is loaded into the system and executed by the CPU 301 (see FIG. 3). Next, the install program executed by the CPU 301 reads out the program realizing the invention, and causes the same to be stored in the hard disk 311.

The illustrated example shows the storage medium for use in the installation of the program executed by the device such as the SFP 110 or the MFP 111. On the other hand, the program which is executed by the expansion card 321 and realizes the invention (expansion card-side main program (see FIG. 8)) is stored in the ROM 402 (see FIG. 4).

According to the present embodiment, only when respective device IDs stored in the DevInfo section 1811 and the DevInfoTmp section 1821 match, the view and use of the secret information stored in the expansion card 321 is permitted. With this configuration, the view and use of the secret information in the expansion card 321 is permitted only by the device (first device) whose secret information has been installed in the expansion card 321, and the leakage and unauthorized use of the secret information can be prevented when the expansion card 321 is inserted into a different device (second device). What is more, when the expansion card 321 is inserted again into the first device, the view and use of the secret information is permitted again. Therefore, it is possible to permit the view and use of secret information in the expansion card 321 only by the device whose secret information has been set into the expansion card 321, and prevent the leakage of secret information via the different device.

Further, the permission/inhibition of the view and use of secret information is determined from the device ID as the identification information on the device side, and hence the permission/inhibition can be controlled based on the kind of device, license information, or the like. This makes it possible to facilitate the control of the view and use of licenses.

Further, it is not necessary to store the information in the device side, and there is no adverse effect on the firmware on the device side. Therefore, it is possible to satisfy the specifications of the system comprised of a device and an expansion card and required to operate whatever expansion card may be connected.

According to the present embodiment, the secret information stored in the KeyInfo section 1812 and the device ID stored in the DevInfo section 1811 are updated by overwriting on condition that the next secret information-setting request is properly executed. With this configuration, for a certain expansion card 321, even after a device to be permitted to refer to the secret information is once determined, it is possible to update information on devices to be given the permission to refer to the secret information, whereby it is possible to freely change the combination of the information processing apparatus and the device.

In particular, the DevInfoTmp section 1821 storing the secret information can also be rewritten. Even a device which has once been inhibited from viewing and using the secret information can issue a new secret information-setting request (step S1208 in FIG. 13). Then, based on the new secret information-setting request, the secret information in the DevlnfoTmp 1812 is updated through a sequence of secret information-setting processes, whereby the device can become a permitted device.

Next, a description will be given of a second embodiment of the present invention. The present embodiment is characterized by adding a process responsive to a password-based process request to the above-described first embodiment. More specifically, in the step S704 in FIG. 7 and the step S803 in FIG. 8, the control is assigned to a different process depending on whether the request is a secret information-setting request, a secret information reference request, a termination request, or a request other than these. In the present embodiment, however, "the password-based process request" is added to these kinds of requests, thereby newly providing processes to be executed when the password-based process request has been made. In the present embodiment, when secret information is stored in the KeyInfo section 1812 in the expansion card-side secret information-setting process in FIG. 12, the expansion card 321 requests the user to input a predetermined password (associated information) via the mounded device. The input password is associated with the secret information, and is stored e.g. in the nonvolatile area 1810 (see FIG. 18). The present embodiment is configured similarly to the first embodiment in the other respects.

Figure 23:
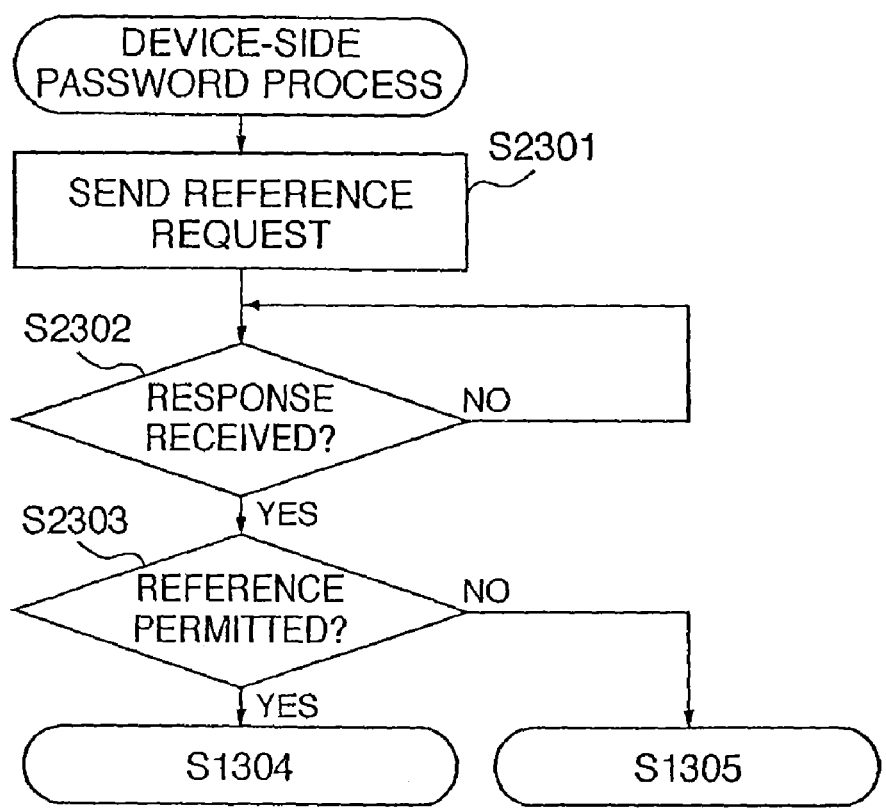
FIG. 23 is a flowchart of a process executed in a second embodiment of the present invention when a password-based process request is determined in a step S704 in FIG. 7.
Figure 24:
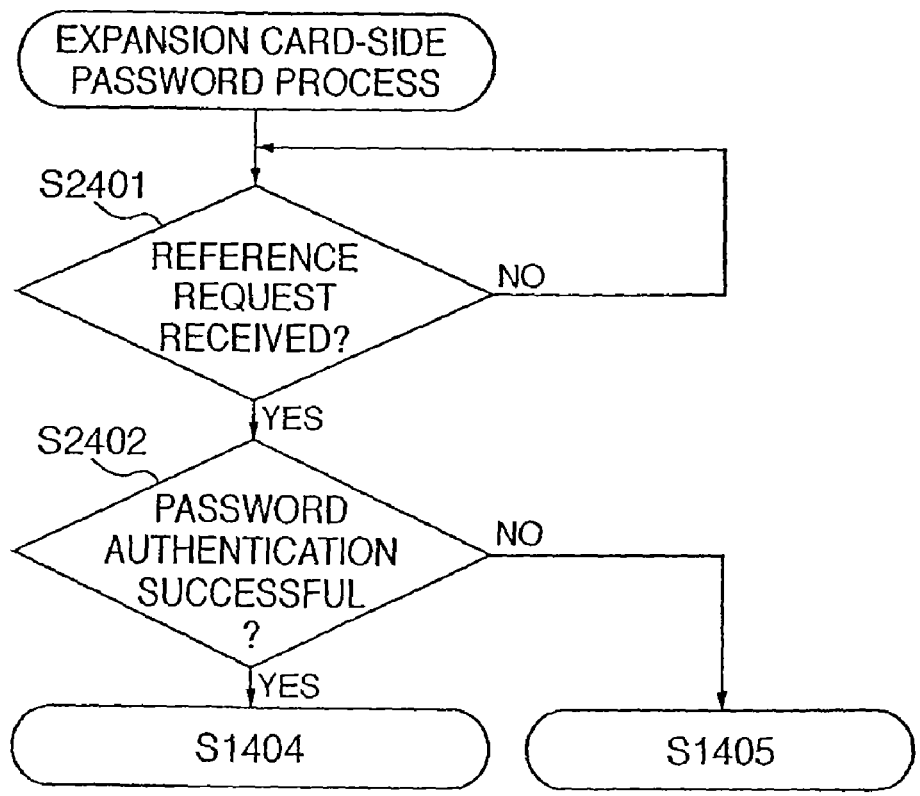
FIG. 24 is a flowchart of a process executed when a password-based process request is determined in a step S803 in FIG. 8 in the second embodiment.

FIG. 23 is a flowchart of a process executed in the second embodiment when a password-based process request is determined in the step S704 in FIG. 7. FIG. 24 is a flowchart of a process executed when a password-based process request is determined in the step S803 in FIG. 8 in the second embodiment.

In FIG. 23, first, the device-side main program sends "a password-based secret information reference request" to the expansion card 321*a* (step S21301), and awaits a response from the expansion card 321*a* to the sent password-based secret information reference request (step S2302). Now, the password-based secret information reference request is configured similarly to the secret information reference request 1600 (see FIG. 16). The password-based secret information reference request is issued when desired by the user e.g. in a process step to be carried out after execution of the step S1305 in FIG. 13. However, this is not limitative, but the password-based secret information reference request may be configured such that it can be issued in desired timing.

When receiving a password-based secret information reference response from the expansion card 321*a*, the device-side main program determines based on the return code in the password-based secret information reference response whether or not reference to the secret information is permitted (step S2303). As a result, if it is determined that reference to the secret information is permitted, the device-side main program proceeds to the step S1304, whereas if the reference is inhibited, the device-side main program proceeds to the step S1305. The processing executed in the steps S1304 and S1305 et seq. is similar to that in FIG. 13, and hence duplicate description thereof is omitted.

In FIG. 24, first, the expansion card-side main program determines whether or not the reception of the password-based secret information reference request from the card equipped device is completed (step S2401). As a result, if it is determined the reception of the password-based secret information reference request is completed, the expansion card-side main program proceeds to a step S2402. In the step S2402, the expansion card-side main program prompts the user to input the password via the card equipped device, thereby performing authentication by comparison between the input password and a password associated with the secret information stored in the KeyInfo section 1812 for determination of a match therebetween. If it is determined as a result of the determination that the authentication has been successful due to the match, the expansion card-side main program proceeds to a step S1404, whereas if it is determined that the authentication has been unsuccessful, the program proceeds to a step S1405. The processing executed in the steps S1404 and S1405 et seq. is similar to that in FIG. 14, and hence duplicate description thereof is omitted.

According to the present embodiment, the same advantageous effects as provided by the first embodiment can be obtained. What is more, in setting secret information, the secret information is stored in association with the password. Thus, even when the permission based on the match of the device IDs cannot be obtained, it is possible to determine based on password-based authentication whether the view and use of the secret information is permitted or inhibited. Even with a device which is inhibited from viewing or using secret information, it is possible to permit the secret information to be viewed or used by inputting a suited password.

It should be noted that in the first and second embodiments, the number of devices in the information processing system is not limited to the two of the SFP 110 and the MFP 111, but it may be not less than three.

The present invention may be applied to a system or an integrated apparatus comprised of a plurality of devices and apparatuses (e.g. a host computer, interface equipment, a reader, etc.), or may be applied to an apparatus formed by a single piece of equipment.

It is to be understood that the object of the present invention may also be accomplished by supplying a system or an apparatus with a storage medium in which a program code of software, which realizes the functions of either of the above described embodiments is stored, and causing a computer (or CPU or MPU) of the system or apparatus to read out and execute the program code stored in the storage medium.

In this case, the program code itself read from the storage medium realizes the functions of either of the above described embodiments, and therefore the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program may be downloaded via a network.

Further, it is to be understood that the functions of either of the above described embodiment may be accomplished not only by executing the program code read out by a computer, but also by causing an OS (operating system) or the like which operates on the computer to perform a part or all of the actual operations based on instructions of the program code.

Further, it is to be understood that the functions of either of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code This application claims the benefit of Japanese Application No. 2005-248162, filed Aug. 29, 2005, which is hereby incorporated by reference herein in its entirety.

What is claimed is:

1. An information processing apparatus that realizes a predetermined function using secret information stored therein, when the information processing apparatus is in a state connected to a device, comprising:
   a secret information-acquiring section that acquires secret information from a device to which the information processing apparatus is connected at a first time;
   a first identification information-acquiring section that acquires, from the device to which the information processing apparatus is connected at the first time, identification information for uniquely identifying the device to which the information processing apparatus is connected at the first time;
   a secret information storage section that stores the secret information acquired by said secret information-acquiring section;
   an identification information storage section that stores the identification information acquired by said first identification information-acquiring section;
   a second identification information-acquiring section that acquires, from a device to which the information processing apparatus is connected at a second time after the first time, identification information for uniquely identifying the device to which the information processing apparatus is connected at the second time, in response to a request for reference to the secret information;
   a determination section that determines whether or not the identification information stored in said identification information storage section and the identification information acquired by said second identification information-acquiring section match; and
   a control section that permits or inhibits reference to the secret information by the device to which the information processing apparatus is connected at the second time, according to a result of the determination by said determination section.

2. An information processing apparatus as claimed in claim 1, wherein the device to which the information processing apparatus is connected the second time makes the request for reference to the secret information,
   wherein said second identification information-acquiring section acquires the identification information from the device having made the request for reference to the secret information, and
   wherein said control section permits or inhibits reference to be made by the device having made the request for reference to the secret information, according to the result of the determination by said determination section.

3. An information processing apparatus as claimed in claim 1, wherein said secret information-acquiring section acquires the secret information from the device to which the information processing apparatus is connected at the first time, in response to a request for setting secret information, and
   wherein said first identification information-acquiring section acquires the identification information from the device to which the information processing apparatus is connected at the first time.

4. An information processing apparatus as claimed in claim 3, wherein when the request for setting the secret information has been made, if prior secret information has already been stored in said secret information storage section, and prior identification information has been stored in said identification information storage section, said secret information storage section stores the secret information newly acquired by said secret information-acquiring section from the device to which the information processing apparatus is connected at the first time, by overwriting, and said identification information storage section stores the identification information newly acquired by said first identification information-acquiring section from the device to which the information processing apparatus is connected at the first time by overwriting.

5. An information processing apparatus as claimed in claim 4, wherein even if said determining section has determined that the identification information overwritten in said identification information storage section and the identification information acquired by said second identification information-acquiring section do not match, if a request for setting new secret information is made by a device to which the information processing apparatus is connected at a third time after the first and second times, said secret information-acquiring section acquires new secret information from the device to which the information processing apparatus is connected at the third time.

6. An information processing apparatus as claimed in claim 1, further comprising:
   an associated information storage section that stores associated information in association with the secret information when said secret information storage section stores the secret information acquired by said secret information-acquiring section, and
   wherein even when said determination section has determined that the identification information stored in said identification information storage section and the identification information acquired by said second identification information-acquiring section do not match, said control section causes associated information to be input via the device, and permits the reference to be made by the device to which the information processing apparatus is connected at the second time to the secret information stored in said secret information storage section, if the input associated information and the associated information stored in said associated information storage section match.

7. The information processing apparatus of claim 1,
   wherein if the determination section determines that the identification information stored in said identification information storage section and the identification information acquired by said second identification information-acquiring section match, (a) it is determined that the device to which the information processing apparatus is connected at the first time is a same device as the device to which the information processing apparatus is connected at the second time, and (b) the control section permits reference to the secret information, and
   wherein if the determination section determines that the identification information stored in said identification information storage section and the identification information acquired by said second identification information-acquiring section do not match, (a) it is determined that the device to which the information processing apparatus is connected at the first time is a different device than the device to which the information processing apparatus is connected at the second time, and (b) the control section inhibits reference to the secret information.

8. A device that holds identification information for uniquely identifying the device, comprising:
- a secret information input section that inputs secret information;
- a secret information-supplying section that supplies the secret information input by said secret information input section to an information processing apparatus connected to the device at a first time;
- a first identification information-supplying section that supplies the identification information to the information processing apparatus connected to the device at the first time;
- a second identification information-supplying section that supplies the identification information to the information processing apparatus currently connected to the device at a second time after the first time, in response to a request for reference to the secret information stored in the information processing apparatus currently connected to the device; and
- a result reception section that receives a result of determination by the information processing apparatus currently connected to the device as to whether or not the identification information supplied by said first identification information-supplying section and the identification information supplied by said second identification information-supplying section match, from the information processing apparatus.

9. A device as claimed in claim 8, comprising a display section, and a control section that is operable when the result of determination received by said result reception section shows a match or a mismatch between the identification information supplied by said first identification information-supplying section and the identification information supplied by said second identification information-supplying section, to cause said display section to display permission or inhibition of the reference to the secret information stored in the information processing apparatus currently connected to the device.

10. A device as claimed in claim 9, comprising a secret information-setting request-reissuing section that is operable when the result of determination received by said result reception section shows a mismatch between the identification information supplied by said first identification information-supplying section and the identification information supplied by said second identification information-supplying section, to prompt input of new secret information, and when the new secret information is input, to newly issue a request for setting new secret information based on the input new secret information.

11. An information processing system comprising:
- a device that holds identification information for uniquely identifying the device; and
- an information processing apparatus connected to the device at least at a first time, the information processing apparatus realizing a predetermined function using secret information stored therein, when said information processing apparatus is in a state connected to the device,
- wherein the device comprises:
- a secret information input section that inputs secret information;
- a secret information-supplying section that supplies the secret information input by said secret information input section to the information processing apparatus connected to the device;
- a first identification information-supplying section that supplies the identification information to the information processing apparatus connected to the device;
- a second identification information-supplying section that supplies the identification information to an information processing apparatus currently connected to the device at a second time after the first time, in response to a request for reference to secret information stored in the information processing apparatus currently connected to the device; and
- a result reception section that receives a result of determination by the information processing apparatus currently connected to the device as to whether or not the identification information supplied by said first identification information-supplying section and the identification information supplied by said second identification information-supplying section match, from the information processing apparatus, and
- wherein said information processing apparatus comprises:
- a secret information-acquiring section that acquires the secret information from the device to which the information processing apparatus is connected at the first time;
- a first identification information-acquiring section that acquires, from the device to which the information processing apparatus is connected at the first time, the identification information for uniquely identifying the device to which the information processing apparatus is connected at the first time;
- a secret information storage section that stores the secret information acquired by said secret information-acquiring section;
- an identification information storage section that stores the identification information acquired by said first identification information-acquiring section;
- a second identification information-acquiring section that acquires, from a device to which the information processing apparatus is connected at the second time, identification information for uniquely identifying the device to which the information processing apparatus is connected at the second time, in response to a request for reference to the secret information stored in said secret information storage section;
- a determination section that determines whether or not the identification information stored in said identification information storage section and the identification information acquired by said second identification information-acquiring section match; and
- a control section that permits or inhibits reference to the secret information by the device to which the information processing apparatus is connected at the second time, according to a result of the determination by said determination section.

12. The information processing system of claim 11, wherein if the determination section determines that the identification information stored in said identification information storage section and the identification information acquired by said second identification information-acquiring section match, (a) it is determined that the device to which the information processing apparatus is connected at the first time is a same device as the device to which the information processing apparatus is connected at the second time, and (b) the control section permits reference to the secret information, and wherein if the determination section determines that the identification information stored in said identification information storage section and the identification information acquired by said second identification information-acquiring section do not match, (a) it is determined that the device to which the information processing apparatus is connected at the first time is a different device than the device to which the information processing apparatus is connected at the second time, and (b) the control section inhibits reference to the secret information.

13. A non-transitory processor-readable storage medium storing an information processing program that, when executed by a computer in an information processing apparatus, causes the information processing apparatus to execute a method that realizes a predetermined function using secret information stored in the information processing apparatus, the method comprising:
- a secret information-acquiring step of acquiring secret information from a device to which the information processing apparatus is connected at a first time;
- a first identification information-acquiring step of acquiring, by a first identification information-acquiring section, from the device to which the information processing apparatus is connected at the first time, identification information for uniquely identifying the device to which the information processing apparatus is connected at the first time;
- a secret information storage step of causing the secret information acquired by said secret information-acquiring step to be stored in a secret information storage section;
- an identification information storage step of causing the identification information acquired by said first identification information-acquiring step to be stored in an identification information storage section;
- a second identification information-acquiring step of acquiring, by a second identification information-acquiring section, from a device to which the information processing apparatus is connected at a second time after the first time, identification information for uniquely identifying the device to which the information processing apparatus is connected at the second time, in response to a request for reference to the secret information stored in said secret information storage section;
- a determination step of determining whether or not the identification information stored in the identification information storage section and the identification information acquired by said second identification information-acquiring step match; and
- a control step of permitting or inhibiting reference to the secret information by the device to which the information processing apparatus is connected at the second time, according to a result of the determination by said determination step.

14. The processor-readable storage medium of claim 13, wherein if the determination step determines that the identification information stored in said identification information storage step and the identification information acquired by said second identification information-acquiring step match, (a) it is determined that the device to which the information processing apparatus is connected at the first time is a same device as the device to which the information processing apparatus is connected at the second time, and (b) the control step permits reference to the secret information, and
wherein if the determination step determines that the identification information stored in said identification information storage step and the identification information acquired by said second identification information-acquiring step do not match, (a) it is determined that the device to which the information processing apparatus is connected at the first time is a different device than the device to which the information processing apparatus is connected at the second time, and (b) the control step inhibits reference to the secret information.

15. A non-transitory processor-readable storage medium storing an information processing program that, when executed by a computer in a device that holds identification information for uniquely identifying the device, causes the device to execute a method comprising:
- a secret information input step of inputting secret information;
- a secret information-supplying step of supplying the secret information input by said secret information input step to an information processing apparatus connected to the device at a first time;
- a first identification information-supplying step, performed by a first identification information-supplying section, of supplying the identification information to the information processing apparatus connected to the device at the first time;
- a second identification information-supplying step, performed by a second identification information-supplying section, of supplying the identification information to an information processing apparatus currently connected to the device at a second time after the first time, in response to a request for reference to the secret information stored in the information processing apparatus; and
- a result reception step of receiving a result of determination by the information processing apparatus currently connected to the device as to whether or not the identification information supplied by said first identification information-supplying step and the identification information supplied by said second identification information-supplying step match, from the information processing apparatus.

16. An information processing method implemented by an information processing apparatus that realizes a predetermined function using secret information stored therein, when the information processing apparatus is in a state connected to a device, the method comprising:
- a secret information-acquiring step of acquiring secret information from a device to which the information processing apparatus is connected at a first time;
- a first identification information-acquiring step of acquiring, by a first identification information-acquiring section, from the device to which the information processing apparatus is connected at the first time, identification information for uniquely identifying the device to which the information processing apparatus is connected at the first time;
- a secret information storage step of storing, in a secret information storage section, the secret information acquired by said secret information-acquiring step;
- an identification information storage step of storing, in an identification information storage section, the identification information acquired by said first identification information-acquiring step;
- a second identification information-acquiring step of acquiring, by a second identification information-acquiring section, from a device to which the information processing apparatus is connected at a second time after the first time, identification information for uniquely identifying the device to which the information processing apparatus is connected at the second time, in response to a request for reference to the secret information;

a determination step of determining whether or not the identification information stored in said identification information storage section and the identification information acquired by said second identification information-acquiring step match; and a control step of permitting or inhibiting reference to the secret information by the device to which the information processing apparatus is connected at the second time, according to a result of the determination by said determination step.

17. A method implemented by a device that holds identification information for uniquely identifying the device, the method comprising:

a secret information input step of inputting secret information;

a secret information-supplying step of supplying the secret information input by said secret information input step to an information processing apparatus connected to the device at a first time;

a first identification information-supplying step, performed by a first identification information-supplying section, of supplying the identification information to the information processing apparatus connected to the device at the first time;

a second identification information-supplying step, performed by a second identification information-supplying section, of supplying the identification information to the information processing apparatus currently connected to the device at a second time after the first time, in response to a request for reference to the secret information stored in the information processing apparatus currently connected to the device; and a result reception step of receiving a result of determination by the information processing apparatus currently connected to the device as to whether or not the identification information supplied by said first identification information-supplying step and the identification information supplied by said second identification information-supplying step match, from the information processing apparatus.

* * * * *